US012562194B2

(12) United States Patent
Zeng et al.

(10) Patent No.: US 12,562,194 B2
(45) Date of Patent: Feb. 24, 2026

(54) METHOD, APPARATUS, DEVICE AND MEDIUM FOR GENERATING A VIDEO

(71) Applicant: Beijing Youzhuju Network Technology Co., Ltd., Beijing (CN)

(72) Inventors: Yan Zeng, Beijing (CN); Guoqiang Wei, Beijing (CN); Hang Li, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/775,954

(22) Filed: Jul. 17, 2024

(65) Prior Publication Data

US 2025/0166667 A1    May 22, 2025

(30) Foreign Application Priority Data

Nov. 17, 2023    (CN) .......................... 202311543966.5

(51) Int. Cl.
| | |
|---|---|
| *G11B 27/036* | (2006.01) |
| *G06F 40/40* | (2020.01) |
| *G06V 20/40* | (2022.01) |

(52) U.S. Cl.
CPC ............ *G11B 27/036* (2013.01); *G06F 40/40* (2020.01); *G06V 20/46* (2022.01)

(58) Field of Classification Search
CPC ........ G11B 27/036; G06F 40/40; G06V 20/46
USPC ......................................................... 386/278
See application file for complete search history.

(56) References Cited

U.S. PATENT DOCUMENTS

| | | | | |
|---|---|---|---|---|
| 10,218,954 | B2 * | 2/2019 | Lakhani ................. | H04N 9/802 |
| 11,277,556 | B2 * | 3/2022 | Katou ..................... | G06T 7/246 |
| 11,797,780 | B1 * | 10/2023 | Finegan ................. | G06F 40/40 |
| 11,941,885 | B2 * | 3/2024 | Balannik ............ | G06V 10/7747 |
| 12,010,371 | B2 * | 6/2024 | Kikuchi ............. | H04N 21/8549 |
| 12,412,370 | B2 * | 9/2025 | Hou ........................ | G06V 10/82 |
| 2019/0325084 | A1 * | 10/2019 | Peng ....................... | G06F 3/013 |

(Continued)

FOREIGN PATENT DOCUMENTS

| | | |
|---|---|---|
| CN | 103650002 A | 3/2014 |
| CN | 112818955 A | 5/2021 |

(Continued)

OTHER PUBLICATIONS

China National Intellectual Property Administration, Office Action Issued in Application No. 202311543966.5, Jul. 31, 2024, 9 pages.

(Continued)

*Primary Examiner* — Helen Shibru
(74) *Attorney, Agent, or Firm* — Alleman Hall LLP

(57) ABSTRACT

Provided are a method, apparatus, device and medium for generating a video. In one method, a plurality of images for respectively describing a plurality of target images in a target video are received. A text for describing a content of the target video is received. The target video is generated based on the plurality of images and the text according to a generation model. With exemplary implementations of the present disclosure, the plurality of images received can serve as guiding data to determine a development direction of a story in the video, which contributes to the generation of a richer and more realistic dynamic video.

18 Claims, 12 Drawing Sheets

(56) References Cited

U.S. PATENT DOCUMENTS

| | | | |
|---|---|---|---|
| 2023/0103947 A1* | 4/2023 | Shields ................... | H04N 5/91 |
| | | | 348/187 |
| 2023/0118966 A1 | 4/2023 | Liu et al. | |
| 2023/0260284 A1 | 8/2023 | Balannik | |
| 2023/0377324 A1* | 11/2023 | Kim ....................... | G06V 10/82 |
| 2024/0171807 A1* | 5/2024 | Fletcher ............. | H04N 21/2625 |
| 2024/0420404 A1* | 12/2024 | Kasap .................... | G06T 13/80 |
| 2025/0229183 A1* | 7/2025 | Iwasaki ................... | A63F 13/79 |

FOREIGN PATENT DOCUMENTS

| | | |
|---|---|---|
| CN | 113051420 A | 6/2021 |
| CN | 113784171 A | 12/2021 |
| CN | 115186133 A | 10/2022 |
| CN | 116233491 A | 6/2023 |
| CN | 116320216 A | 6/2023 |
| CN | 116363563 A | 6/2023 |
| CN | 116740204 A | 9/2023 |
| CN | 116916112 A | 10/2023 |
| CN | 116939320 A | 10/2023 |
| JP | 2021033961 A | 3/2021 |
| JP | 2023062173 A | 5/2023 |
| JP | 2023095832 A | 7/2023 |
| KR | 1020180065498 A | 6/2018 |
| KR | 1020200032614 A | 3/2020 |
| WO | 2020150688 A1 | 7/2020 |
| WO | 2021164326 A1 | 8/2021 |
| WO | 2022221080 A1 | 10/2022 |

OTHER PUBLICATIONS

Wang, Z. et al., "A Review of Text-to-Visual Speech Synthesis," Journal of Computer Research and Development, vol. 43, No. 1, Jan. 28, 2006, 8 pages. Submitted with English translation of abstract.

Xu, Z. et al., "Moving target detection of the video images," Computer Era, vol. 2006, No. 8, Aug. 25, 2006, 3 pages. Submitted with English translation of abstract.

China National Intellectual Property Administration, Notice of Allowance Issued in Application No. 202311543966.5, Nov. 6, 2024, 6 pages.

Japan Patent Office, Office Action Issued in Application No. 2024114361, Nov. 19, 2024, 8 pages.

Denton, R. et al., "Unsupervised Learning of Disentangled Representations from Video," arXiv:1705.10915v1, May 31, 2017, 13 pages.

Tulyakov, S. et al., "MoCoGaN: Decomposing Motion and Content for Video Generation," arXiv:1707.04993v2, Dec. 14, 2017, 14 pages.

China National Intellectual Property Administration, Notice of Grant of Patent Right for invention from Chinese patent application No. 202311543966.5 mailed on Nov. 6, 2024, 6 pages.

European Patent Office, Extended European Search Report for European Application No. 24189153.0, mailed Dec. 12, 2024, 8 Pages.

Lin H., et al., "VideoDirectorGPT: Consistent Multi-scene Video Generation via LLM-guided Planning", arxiv.org, Cornell University Library, 201 Olin Library Cornell University Ithaca, NY 14853, Sep. 26, 2023, XP091623860, 25 Pages.

Japan Patent Office, Notification of Grant Issued in Application No. 2024-114361, Mar. 25, 2025, 6 pages.

Dorkenwald, M. et al., "Stochastic Image-to-Video Synthesis using cINNs," 2021 IEEE/CVF Conference on Computer Vision and Pattern Recognition (CVPR), Jun. 17, 2021, 18 pages.

Hong, W. et al., "CogVideo: Large-scale Pretraining for Text-to-Video Generation via Transformers," Available Online at https://arxiv.org/abs/2205.15868, May 29, 2022, 15 pages.

Korean Intellectual Property Office, Office Action Issued in Application No. 10-2024-0094655, Apr. 30, 2025, 12 pages.

China National Intellectual Property Administration, Office Action Issued in Application No. 202510020700.5, Sep. 27, 2025, 15 pages.

* cited by examiner

400

500

1600

1610

RECEIVE A PLURALITY OF IMAGES RESPECTIVELY FOR DESCRIBING A PLURALITY OF TARGET IMAGES IN A TARGET VIDEO

1620

RECEIVE A TEXT FOR DESCRIBING A CONTENT OF THE TARGET VIDEO

1630

GENERATE THE TARGET VIDEO BASED ON THE PLURALITY OF IMAGES AND THE TEXT ACCORDING TO A GENERATION MODEL

1700

IMAGE RECEIVING MODULE — 1710

TEXT RECEIVING MODULE — 1720

GENERATION MODULE — 1730

METHOD, APPARATUS, DEVICE AND MEDIUM FOR GENERATING A VIDEO

CROSS-REFERENCE

The present application claims priority to Chinese Patent Application No. 2023115439665, filed on Nov. 17, 2023, and entitled "METHOD, APPARATUS, DEVICE AND MEDIUM FOR GENERATING A VIDEO", the entirety of which is incorporated herein by reference.

FIELD

Exemplary implementations of the present disclosure relate generally to computer vision, and in particular to a method, apparatus, device and computer readable storage medium for generating a video by using a machine learning model.

BACKGROUND

The machine learning technology has been widely used in many technical fields. In the field of computer vision, many technical solutions have been proposed to automatically generate videos by using a machine learning model. For example, the corresponding video may be generated based on a pre-specified image and a text for describing a video content. However, at present, pictures in the generated video usually have poor dynamicity, for example, objects in the video lack obvious actions and dynamic effects, so it is difficult to achieve real motion visual effects. At this time, it is expected that the dynamic video including desired contents can be generated in a more convenient and effective way.

SUMMARY

In a first aspect of the present disclosure, a method for generating a video is provided. In the method, a plurality of images for respectively describing a plurality of target images in a target video are received. A text for describing a content of the target video is received. The target video is generated based on the plurality of images and the text according to a generation model.

In a second aspect of the present disclosure, an apparatus for generating a video is provided. The apparatus includes: an image receiving module configured to receive an image for describing at least any of a head image and a tail image of the target video; a text receiving module configured to receive a text for describing a content of the target video; and a generation module configured to generate the target video based on the image and the text according to a generation model.

In a third aspect of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the electronic device to execute the method according to the first aspect of the present disclosure.

In a fourth aspect of the present disclosure, a computer-readable storage medium is provided and has a computer program stored thereon, wherein the computer program, when executed by a processor, causes the processor to implement the method according to the first aspect of the present disclosure.

It should be understood that the content described in this section is not intended to define key features or important features of implementations of the present disclosure, nor is it intended to limit the scope of the present disclosure. Other features of the present disclosure will be readily understood from the following descriptions.

BRIEF DESCRIPTION OF THE DRAWINGS

The above and other features, advantages and aspects of various implementations of the present disclosure will become more apparent hereinafter with reference to the following detailed descriptions and in conjunction with the accompanying drawings. The same or similar reference numerals indicate the same or similar elements in the accompanying drawings, in which.

DETAILED DESCRIPTION

Figure 1:
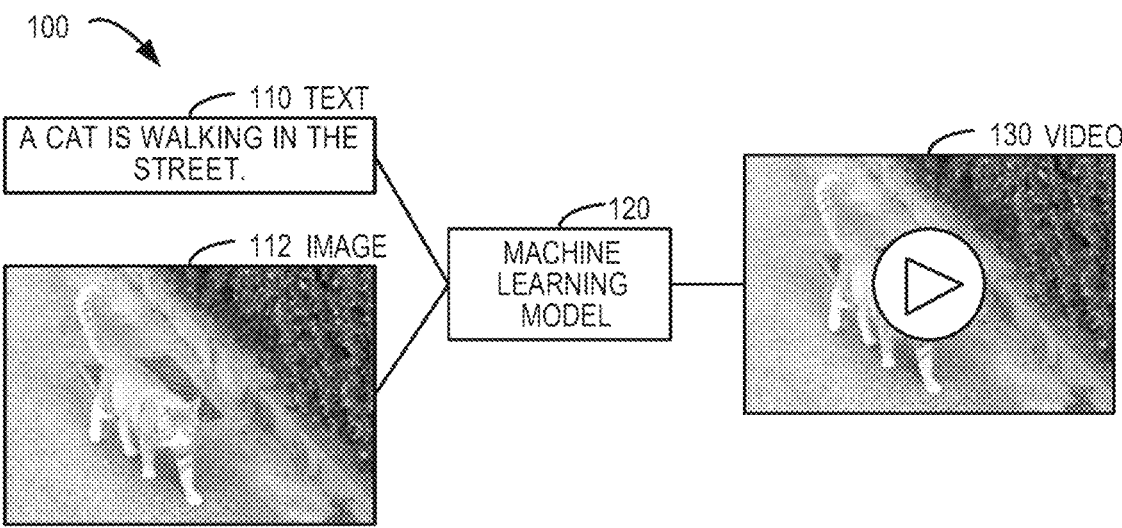
FIG. 1 shows a block diagram according to a technical solution for generating a video.

Hereinafter, the implementations of the present disclosure will be described in more detail with reference to the accompanying drawings. Although some implementations of the present disclosure are shown in the accompanying drawings, it should be understood that the present disclosure can be realized in various forms and should not be construed as limited to the implementations set forth here. On the contrary, these implementations are provided for a more thorough and complete understanding of the present disclosure. It should be understood that the accompanying drawings and implementations of the present disclosure are only used for illustrative purposes, and are not used to limit the protection scope of the present disclosure.

In the descriptions of the implementations of the present disclosure, the term "includes" and similar terms should be understood as open inclusion, that is, "includes but not limited to". The term "based on" should be understood as "at least partially based on". The term "one implementation" or "the implementation" should be understood as "at least one implementation". The term "some implementations" should be understood as "at least some implementations". Other explicit and implicit definitions may be included below. As used herein, the term "model" may represent an association relationship between various data. For example, the above association relationship may be acquired based on various technical solutions currently known and/or to be developed in the future.

It is understandable that the data involved in this technical solution (including but not limited to the data itself and acquisition or use of the data) shall comply with the requirements of corresponding laws, regulations and relevant stipulations.

It is understandable that before using the technical solutions disclosed in various implementations of the present disclosure, users should be informed of the types, use scopes, use scenes and the like of personal information involved in the present disclosure in an appropriate way according to relevant laws and regulations, and user authorization should be acquired.

For example, in response to receiving an active request of the user, prompt information is sent to the user to explicitly remind the user that the operation requested to be executed will require the acquisition and use of the personal information of the user. Therefore, the user can independently choose whether to provide the personal information to software or hardware such as an electronic device, an application program, a server or a storage medium that executes operations of the technical solutions of the present disclosure according to the prompt information.

As an optional but non-limiting implementation, in response to receiving the active request of the user, the prompt information may be sent to the user, for example, in a pop-up window, in which the prompt information may be presented in words. In addition, the pop-up window may also carry a selection control for the user to choose "agree" or "disagree" to provide the personal information to the electronic device.

It is understandable that the above process of notifying and acquiring the user authorization is only schematic and does not limit the implementations of the present disclosure, and other ways meeting relevant laws and regulations may also be applied to the implementations of the present disclosure.

The term "in response to" used here indicates a state in which a corresponding event occurs or a condition is met. It will be understood that the execution timing of a subsequent action executed in response to the event or condition is not necessarily strongly related to the time when the event occurs or the condition is established. For example, in some cases, the subsequent action may be executed immediately when the event occurs or the condition is established; and in other cases, the subsequent action may be executed after a period of time has passed since the event occurred or the condition was established.

Exemplary Environment

The machine learning technology has been widely used in many technical fields. In the field of computer vision, it has been proposed to automatically generate videos by using a machine learning model. The existing video generation methods mainly focus on text-to-video generation or single image-based generation. Although the generated video can involve object movement, the action duration is short and only has transient dynamicity, the dynamicity is poor and the expected information is not presented.

A generation way is described with reference to FIG. 1, which shows a block diagram 100 according to a technical solution for generating a video. As shown in FIG. 1, a machine learning model 120 may be acquired, where the machine learning model 120 may be generated based on reference data in a pre-built training data set. A text 110 may be used to specify a content of the video to be generated, and an image 112 may be used to specify an environment of the video (for example, as a first frame image, or an image at other positions). In this example, the text 110 may indicate, for example, "a cat is walking in the street". At this time, the machine learning model 120 may generate a video 130 based on the text 110 and 112, and the video content is that the cat is walking along the street.

However, it is usually difficult for the pictures in the video generated at present to achieve real dynamic effects. Creation of high-dynamic action videos, complex camera actions, visual effects, close-ups of expressions or shot transition faces an arduous challenge. The current video generation methods mainly focus on text-to-video generation, tend to generate videos with a minimum motion amplitude, and can only generate shorter video clips, the shape of an object (for example, the cat) in the video may be similar to that in the image 112, and movements of the cat are possibly stiff and the motion amplitude is very small. At this time, it is expected that the dynamic video including desired contents can be generated in a more convenient and effective way.

Summary of Video Generation

Since the video requires an extra time dimension and consists of many key frames, it is difficult to accurately describe each key frame with a simple language. In addition, the types of motion in the video are very diverse. The existing technical solutions are not only resource-intensive, but also pose considerable challenges to a generation model. In order to understand complex text descriptions and generate matching videos, a scale of the model will increase dramatically, and the amount of required annotation data will also increase significantly.

In order to at least partially solve the shortcomings in the prior art, according to an exemplary implementation of the present disclosure, the technical solution of generating a video based on a diffusion model (for example, called PixelDance) is proposed. In summary, a machine learning architecture based on the diffusion model is proposed, which can combine image instructions of a first frame and a last frame in the video with text instructions for generating a video. Comprehensive experimental results show that the video generated by using the technical solution of the present disclosure shows excellent visual effects in synthesizing the videos with complex scenes and complex movements.

Figure 2:
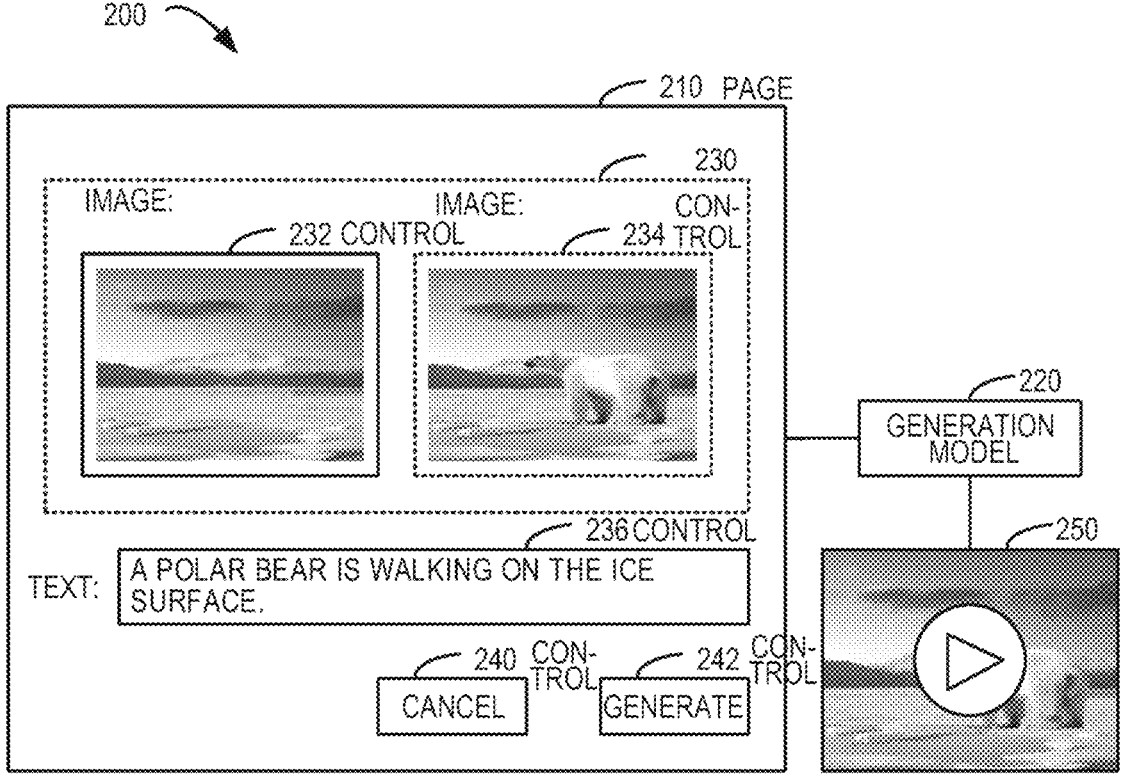
FIG. 2 shows a block diagram of a process for generating a video according to some implementations of the present disclosure.

It should be understood that the generation model here may be a pre-trained model, and a target video may be generated based on this model. The summary of an exemplary implementation of the present disclosure is described with reference to FIG. 2, which shows a block diagram 200 of a process for generating a video according to some implementations of the present disclosure. As shown in FIG. 2, a page 210 may be provided, and controls for a plurality of images for describing a plurality of target images in a target video may be provided in a region 230. It should be understood that the plurality of target images here may be a plurality of chronologically ordered target images in the target video. For example, a control 232 for describing a preceding target image may be provided, and a control 234 for describing a following target image may be provided. Further, a control 236 for receiving a text describing the content of the target video may be provided.

According to an exemplary implementation of the present disclosure, the video generation process may be realized in a multilingual environment. Although the reference text in FIG. 2 is expressed in English, alternatively and/or additionally, the text may be expressed based on other languages, such as Chinese, French and Japanese. Further, a user may call the generation model 220 via a control 242 to then generate a target video 250. Alternatively and/or additionally, the user may return to a previous page via a control 240.

It should be understood that the generation model 220 here is obtained by combining the image instructions of the first and last frames with the text instructions for generating a video. By specifying a plurality of images in the target video, the generation model 220 can more comprehensively understand the change trend of each image in the video, and thus can also show excellent visual effects in synthesizing the videos with complex scenes and complex movements.

According to an exemplary implementation of the present disclosure, the plurality of images here includes a first image for describing a head image in the plurality of target images, and a second image for describing a tail image in the plurality of target images. At this time, the generation model 220 may generate the target video 250 based on the received first image, the received second image and the received text. Richer changing information can be provided by means of the plurality of images as compared with the existing technical solutions for generating a video based on a single image and text only. In particular, since the head image and the tail image are located at the head and tail ends of the target video respectively, more guiding information about the visual changes can be provided for the video generation process, such that the target video 250 can achieve a more brilliant dynamic visual effect.

It should be understood that the head image here may represent one or more images within a predetermined range at the beginning of the target video, for example, the first frame, the second frame, the third frame and the like in the target video. Similarly, the tail image may represent one or more images within a predetermined range at the end of the target video, for example, the last frame, the second last frame, the third last frame and the like in the target video.

Detailed Process of Video Generation

The summary of video generation has been described, and more details about the video generation will be described below. It should be understood that FIG. 2 depicts the process of receiving the first image and the second image by way of example only, and that the above images may be received in a variety of ways. For example, a user-entered image address may be received at a control(s) 232 and/or 234, or the user may drag and drop an image to the control(s) 232 and/or 234, and so on. According to an exemplary implementation of the present disclosure, the second image may be received in a more flexible manner. Specifically, the second image may be received via at least any of: an import control for importing an address of the second image; a draw control for drawing the second image; or an edit control for editing the first image to generate the second image.

Figure 3A:
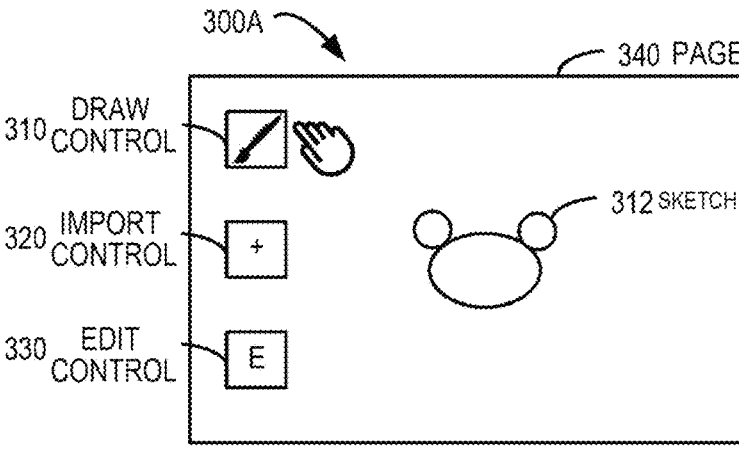
FIGS. 3A, 3B and 3C each show a block diagram of acquiring a second image according to some implementations of the present disclosure.

More details about the acquisition of the second image are described with reference to FIGS. 3A, 3B and 3C. FIG. 3A shows a block diagram 300A of acquiring a second image according to some implementations of the present disclosure. As shown in FIG. 3A, a page 340 for receiving the second image may include a plurality of controls. Specifically, the following may be provided: a draw control 310 for drawing the second image; an import control 320 for importing the address of the second image; and an edit control 330 for editing an image (for example, the first image or an additional image imported) to generate the second image. A user may interact with the draw control 310, in which case the draw tool may be called to draw a sketch 312 of the second image.

Figure 3B:
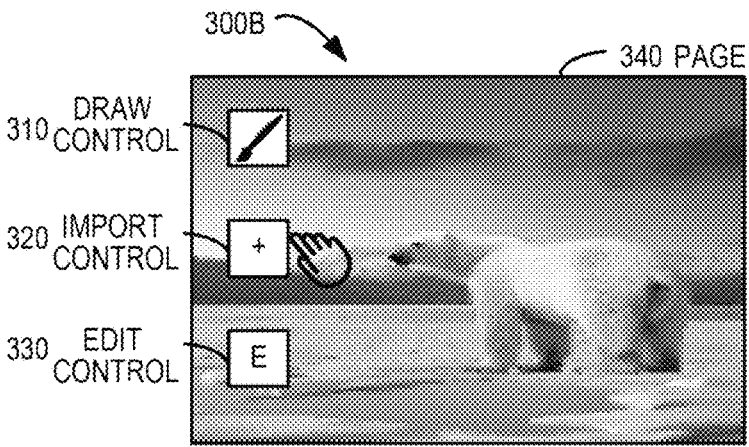
Figure 3C:
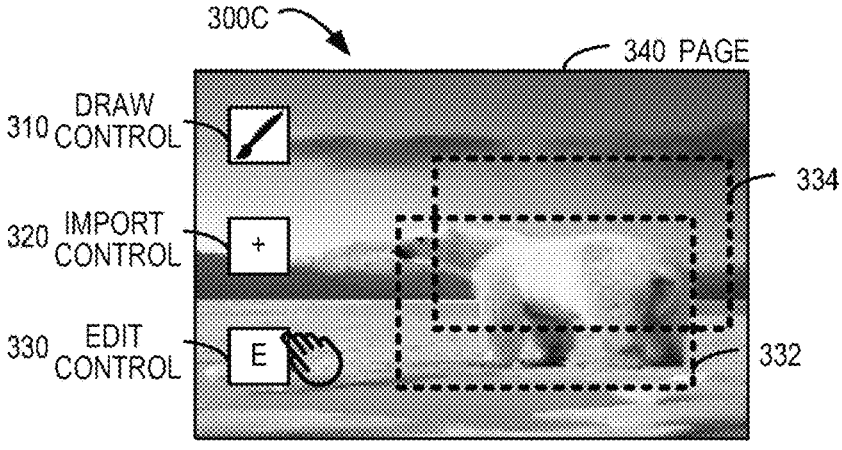

FIG. 3B shows a block diagram 300B of acquiring a second image according to some implementations of the present disclosure. As shown, a user may interact with the import control 320, in which case an image file may be imported as the second image. FIG. 3C shows a block diagram 300C of acquiring a second image according to some implementations of the present disclosure. As shown, a user may interact with the edit control 330 to obtain the second image. In the context of the present disclosure, a user may edit the first image to generate the second image. For example, the user may edit an imported additional image to obtain the second image. For example, the user may move a polar bear at a position 332 to a position 334, and so on. In this way, the user may specify the tail image of the target video in a flexible and effective manner.

Figure 4:
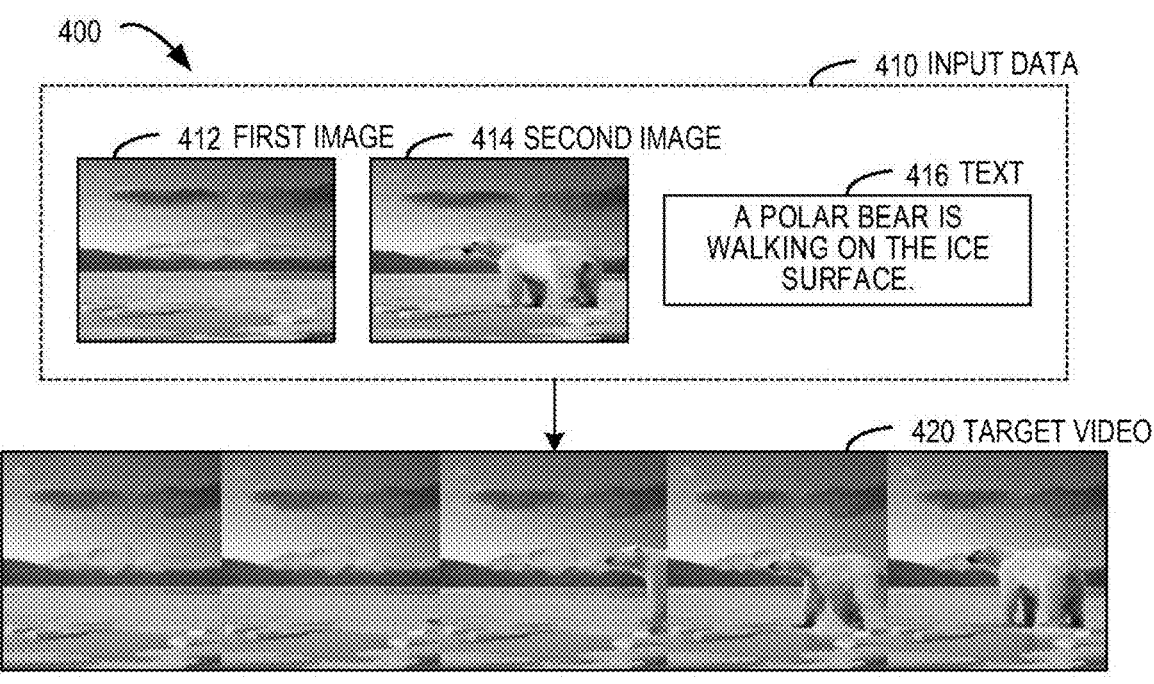
FIG. 4 shows a block diagram of a process for generating a video according to some implementations of the present disclosure.

FIG. 4 shows a block diagram 400 of a process for generating a video according to some implementations of the present disclosure. A user may specify input data 410 for the generation model in the manner described above. For example, the user may use the import control to import the first image 412 and the second image 414, respectively, and may enter a text 416. The first image 412 may guide the generation of the first frame in a target video 420, and the second image 414 may guide the generation of the last frame in the target video 420. At this time, the first frame of the target video 420 corresponds to the first image 412, the last frame of the target video 420 corresponds to the second image 414, and the content of the video is "A polar bear is walking on the ice surface".

Figure 5:
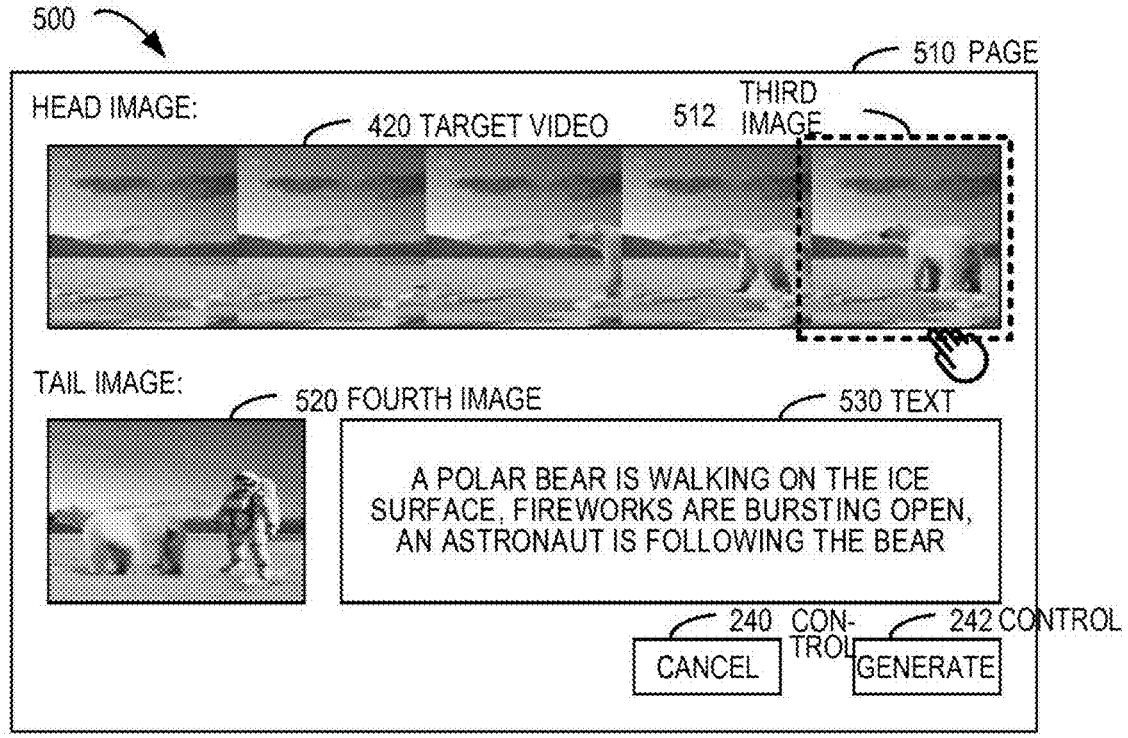
FIG. 5 shows a block diagram of a page for receiving input data for generation of a subsequent video according to some implementations of the present disclosure.

According to an exemplary implementation of the present disclosure, a plurality of target videos may be generated continuously. For example, an image (for example, the last frame or other images) in the currently generated video may be taken as the head image for the following video, and then more videos may be generated cumulatively. More details are described with reference to FIG. 5, which shows a block diagram 500 of a page for receiving input data for generation of a subsequent video according to some implementations of the present disclosure. As shown in FIG. 5, a plurality of images of the target video (for example, the currently generated target video 420) may be provided on the page 510.

A user may interact with a desired image to select the head image from a plurality of images to generate the subsequent video. For example, the user may click a third image 512 in the target video 420, and thus specify a head image for describing a further target video subsequent to the target video. The user may specify the tail image as the fourth image 520 and enter the text 530 at a text box. At this time, a further text for describing a content of the further target video and the fourth image for describing the tail image of the further target video may be acquired. Further, the generation model may generate the further target video based on the third image 512, the fourth image 520 and the further text 530.

Figure 6:
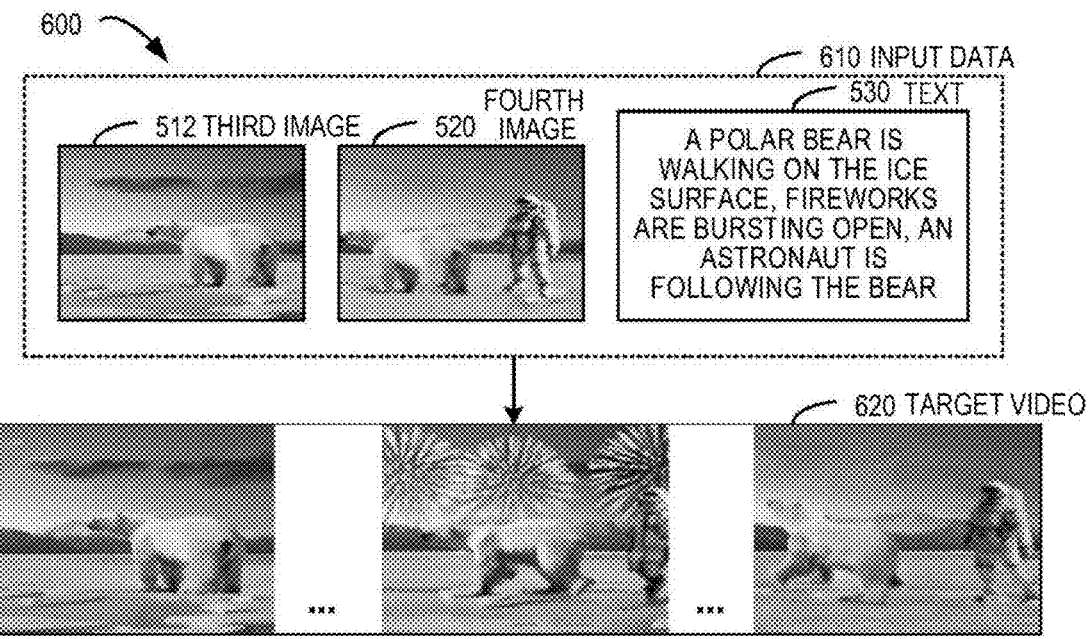
FIG. 6 shows a block diagram of a process for generating a subsequent video according to some implementations of the present disclosure.

As shown in FIG. 5, the user may press the control 242 to generate the further target video. More details are described with reference to FIG. 6, which shows a block diagram 600 of a process for generating a subsequent video according to some implementations of the present disclosure. As shown in FIG. 6, input data 610 may include a third image 512, a fourth image 520 and a text 530. At this time, the third image 512 may guide the generation of the first frame in a target video 520, and the fourth image 520 may guide the generation of the last frame in the target video 520. For example, the last frame may be the same as or different from the fourth image 520, and the content of the video is "a polar bear is walking on the ice surface, fireworks are bursting open, an astronaut is following the bear".

According to an exemplary implementation of the present disclosure, the target video and the further target video may be connected. The tail image of the current video may be used as the head image of the next video to be generated in a cumulative manner. In this way, subsequent videos can be generated continuously, and a long video including richer plots can be generated step by step. With the exemplary implementation of the present disclosure, the complexity of video creation can be greatly simplified. For example, shorter videos may be constructed in the way of film storyboards, and then these videos may be edited to generate longer videos.

It has been described above to specify the second image by importing the image, and alternatively and/or additionally, the second image may be a sketch specifying the content of the tail image of the target video. In some cases, it is difficult to acquire the end picture of the target video to be generated, and the content of the tail image may be specified based on the sketch (for example, hand drawing) in a simpler and more effective manner.

Figure 7:
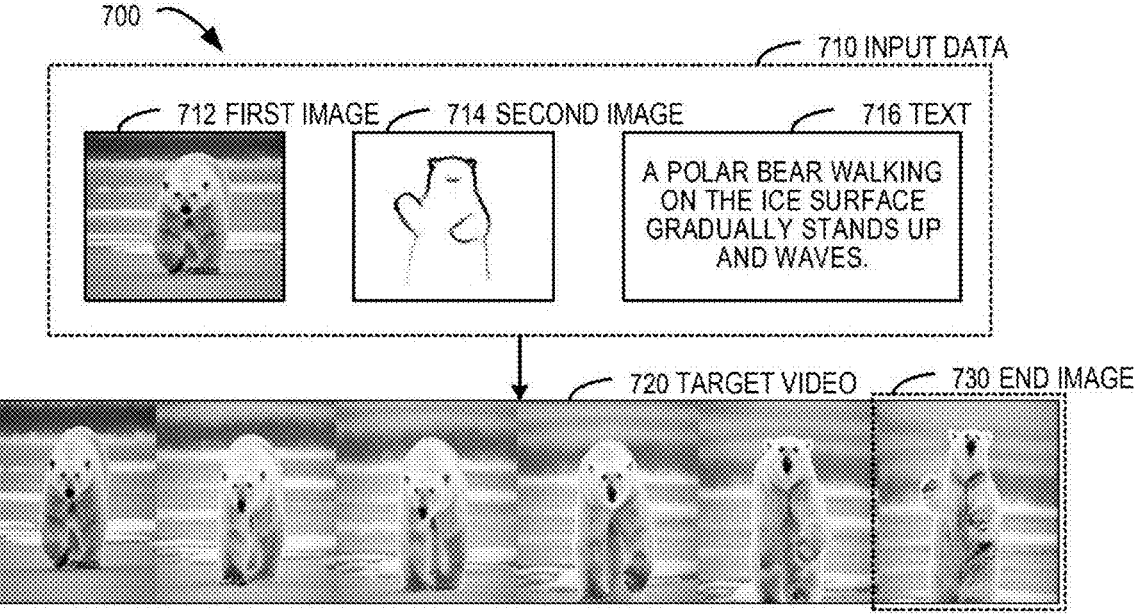
FIG. 7 shows a block diagram of a process for generating a video based on a sketch according to some implementations of the present disclosure.

FIG. 7 shows a block diagram 700 of a process for generating a video based on a sketch according to some implementations of the present disclosure. As shown in FIG. 7, input data 710 may include a first image 712, a second image 714 and a text 716. At this time, the second image 714 may guide the generation of the last frame in a target video 720.

At this time, the polar bear in the last frame may wave according to a gesture specified in the second image 714. At this time, the first frame of the target video 720 corresponds to the first image 712, the last frame of the target video 720 corresponds to the second image 714, and the content of the video is "a polar bear walking on the ice surface gradually stands up and waves". With the exemplary implementation of the present disclosure, the gesture and position of an object in the video can be specified in a more convenient and effective way, thereby facilitating the generation of the dynamic video including richer visual contents.

Although the instance that the input data for generating a single video is specified on the page is shown above, alternatively and/or additionally, the page may further include controls for receiving a plurality of images and a long text. At this time, a user may enter a plurality of images for respectively describing a plurality of keyframes in the long video, and a long text for describing the content of the long video. Then, the machine learning model may determine, based on the plurality of images and long text received, the images and text for generating image fragments.

Figure 8:
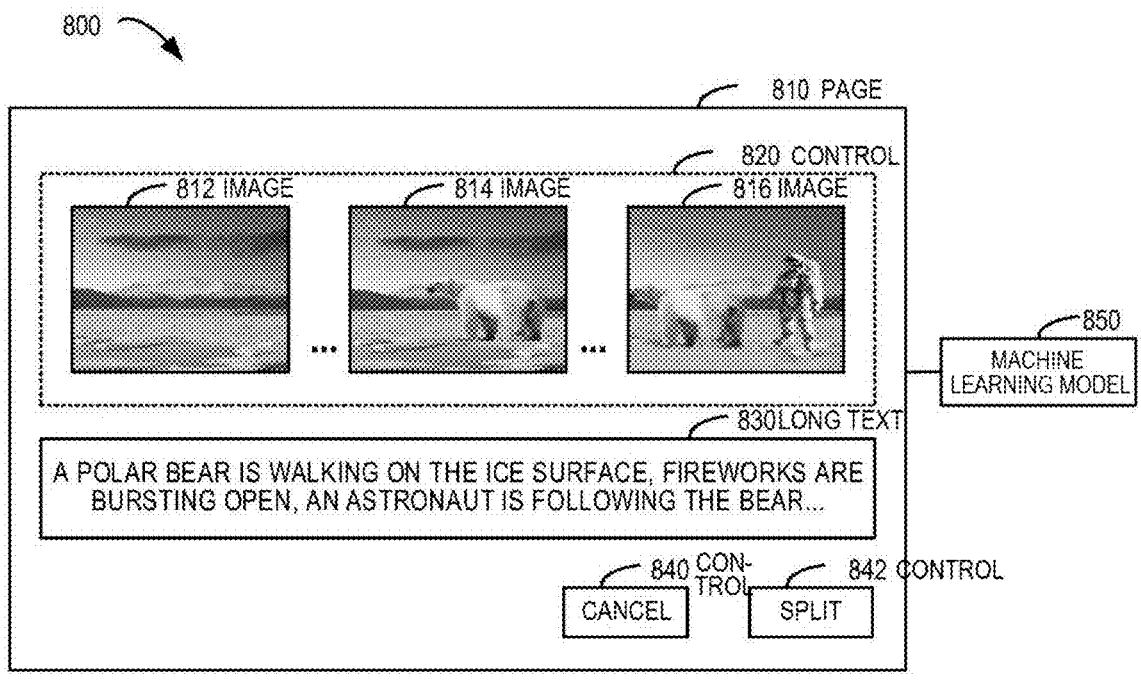
FIG. 8 shows a block diagram of a process for acquiring a candidate input by using a machine learning model according to some implementations of the present disclosure.

More details are described with reference to FIG. 8, which shows a block diagram 800 of a process for acquiring a candidate input by using a machine learning model according to some implementations of the present disclosure. As shown in FIG. 8, a user may interact with a control 820 to input a plurality of chronologically ordered images 812, . . . , 814, . . . , 816, and may further enter a long text 830. The user may press a control 842 to call the machine learning model 850 to execute further processing; and alternatively and/or additionally, the user may press a control 840 to return to a previous page.

It should be understood that the machine learning model 850 here may be a pre-trained model with text and image processing capabilities. For example, the machine learning model 850 may be implemented based on the large language model. After receiving the plurality of images and the long text 830, the machine learning model 850 may split the long text 830 into a plurality of shorter texts, and select, from the plurality of images, head and tail images that match the respective shorter texts.

Figure 9:
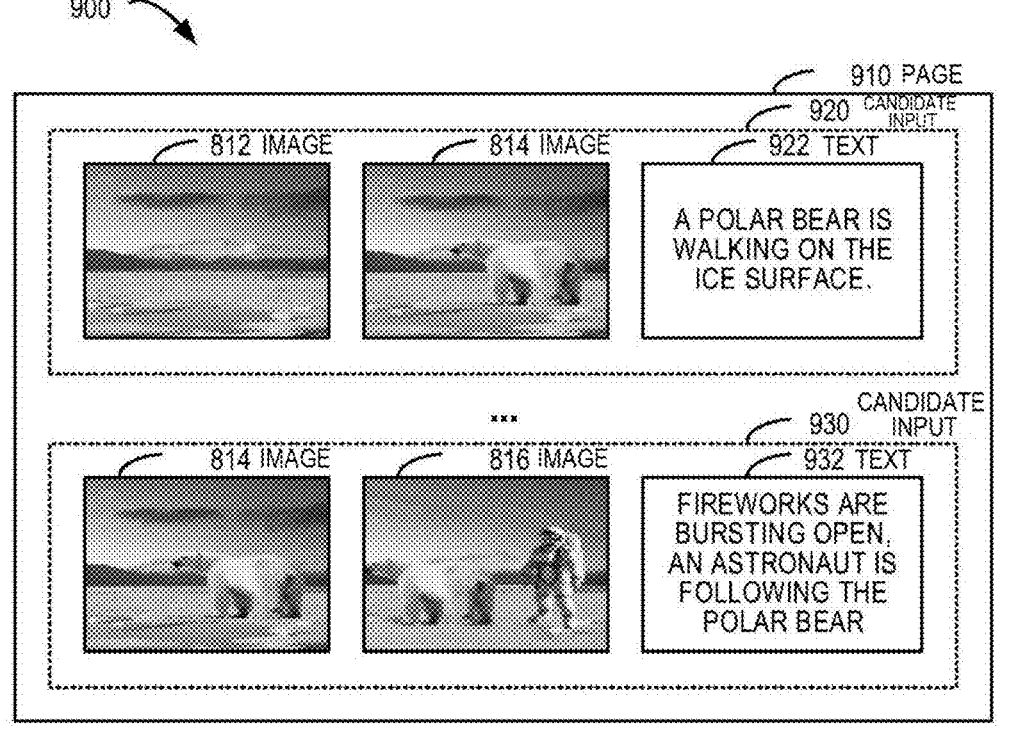
FIG. 9 shows a block diagram of a plurality of candidate inputs according to some implementations of the present disclosure.

The output results of the machine learning model 850 are described with reference to FIG. 9, which shows a block diagram 900 of a plurality of candidate inputs according to some implementations of the present disclosure. As shown in FIG. 9, a page 910 may include a plurality of candidate inputs, and each candidate input may correspond to a shorter video clip. The candidate inputs include, for example, images for describing the first and last frames of the video clip, and a text describing the content of the video clip. On the page 910, a candidate input 920 may include images 812 and 814 and a text 922; . . . ; and a candidate input 930 may include images 814 and 816 and a text 932. With the example implementations of the present disclosure, the powerful processing capability of the machine learning model 850 may be fully utilized to assist in the video generation process. For example, in the film and television creation, a scrip fragment represented in text may be input into the machine learning model 850, which may automatically output relevant images and text descriptions of a plurality of split shots. In this way, the generation performance of the machine learning model may be greatly improved.

According to an exemplary implementation of the present disclosure, a summary text for describing a long video may be received, and then, a plurality of texts for respectively describing contents of a plurality of video clips in the long video is determined based on the summary text and according to a machine learning model. It should be understood that the summary text here may describe the leading characters, environment, synopsis or the like of the desired video to be generated. Specifically, the summary text may require the generation of a story that takes place in the North Pole with a polar bear and an astronaut as leading characters, with the synopsis that the astronaut's spacecraft accidentally lands in the North Pole, and the astronaut comes across and gradually makes friend with the polar bear.

This summary text may be input into the machine learning model, and the powerful language competence of the machine learning model may be then utilized to assist in creation and generate rich storylines. The machine learning model may also automatically split these storylines into a plurality of shots and generate corresponding description texts. Further, the machine learning model may generate target images corresponding to a plurality of texts, respectively, i.e., specifying the first and last frame images for the video clip of each shot. At this time, the generated individual target texts and corresponding images may be input into the generation model, so as to obtain a longer dynamic video including rich storylines.

Figure 10:
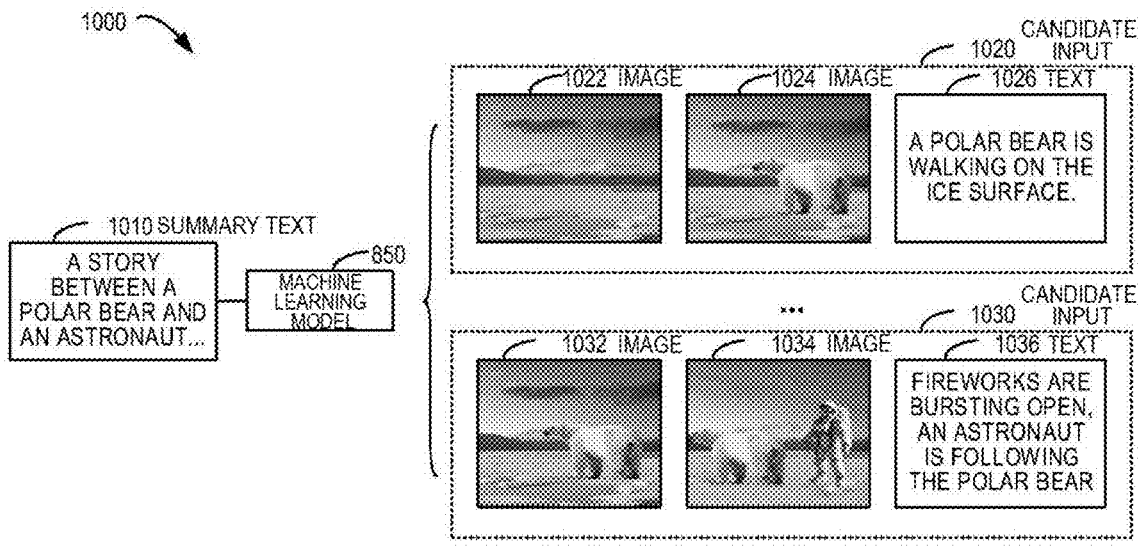
FIG. 10 shows a block diagram of a process for acquiring a candidate input based on a summary text by using the machine learning model according to some implementations of the present disclosure.

FIG. 10 shows a block diagram 1000 of a process for acquiring a candidate input based on a summary text by using the machine learning model according to some implementations of the present disclosure. As shown in FIG. 10, a summary text 1010 may be input into the machine learning model 850, in which case the summary text 1010 may only define the desired creation of a video about a story between a polar bear and an astronaut, and so on. The machine learning model 850 may generate a plurality of candidate inputs based on the summary text 1010. For example, a candidate input 1020 could include images 1022 and 1024 and a text 1026; . . . ; and a candidate input 1030 may include images 1032 and 1034 and a text 1036.

It should be understood that the texts 1026 and 1036 here may be generated based on the summary text 1010, the images 1022 and 1024 may be generated based on the text 1026, and the images 1032 and 1034 may be generated based on the text 1036. In this process, a user may obtain a plurality of candidate inputs without complex manual labor, only by entering the summary text. Further, the generation model may generate a corresponding video based on these candidate inputs. In this way, the powerful text processing and text-to-image conversion capabilities of the machine learning model 850 may be utilized to assist in the generation of a longer video including richer dynamic contents.

According to an exemplary implementation of the present disclosure, the machine learning model may be used to assist in the subsequent video creation. For example, a video that has been generated may be input into the machine learning model, which may be required to provide a description for the subsequent content of the video. The machine learning model may determine prompt information associated with a further target video subsequent to the target video based on the target video, where the prompt information includes at least one image and a further text, for example. Then, the generation model may generate the further target video based on the at least one image and the further text.

Figure 11:
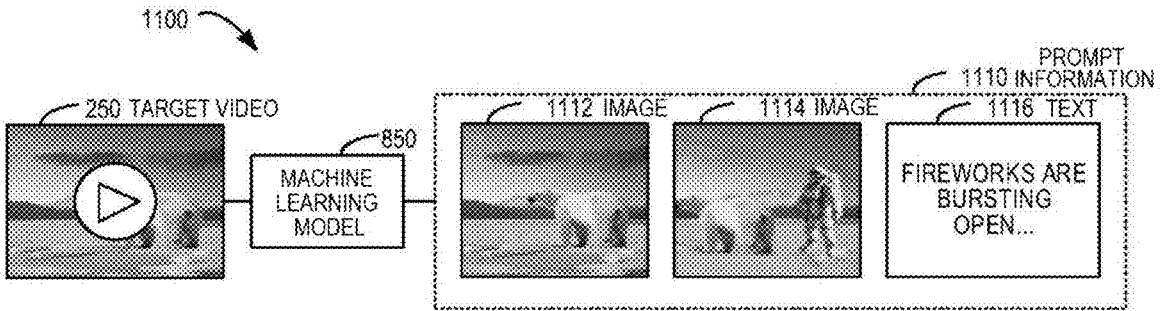
FIG. 11 shows a block diagram of a process for acquiring prompt information based on the machine learning model according to some implementations of the present disclosure.

More details are described with reference to FIG. 11, which shows a block diagram 1100 of a process for acquiring the prompt information based on the machine learning model according to some implementations of the present disclosure. As shown in FIG. 11, a target video 250 that has been generated may be input into the machine learning model 850, and at this point, the machine learning model 850 may output prompt information 1110, which may include an image 1112 for describing the first frame of a subsequent video, an image 1114 for describing the last frame of the subsequent video, and a text 1116 for describing the content of the subsequent video. A user may interact with the above prompt information 1110, and in a case where the prompt information 1110 is confirmed, the prompt information 1110 may be directly input into the generation model.

Alternatively and/or additionally, an edit control for editing the prompt information 1110 may be provided. For example, the user may modify images 1112 and 1114 and the text, and then the modified prompt information 1110 may be input into the generation model. In this way, in the process of automatically generating a story script with the aid of the powerful processing capability of the machine learning model 850, a user is allowed to make adjustment according to his/her own expectations to obtain a video that is more in line with his/her expectations. In this way, the powerful reasoning capability of the machine learning model may be fully utilized to write the scripts of the subsequent shots so as to generate subsequent videos.

It should be understood, although the above describes an example where the user specifies the first frame image, the last frame image, and the text to generate the model, alternatively and/or additionally, a new video may be created by selecting two images from an existing video and using a text description that is different from the content of the existing video. For example, if the user is not satisfied with the generated video in which a polar bear is walking on the ice surface, the text may be adjusted to "a polar bear is running on the ice surface". At this time, the content of the generated new video will be different from that of the existing video, for example, a video in which a polar bear is running is generated. In this way, in a case where the user is not satisfied with the existing video, the user may adjust the content of the video by a simple way of modifying the text description, so as to achieve a higher video generation performance. For example, in the film and television production, a user may make different versions of a shot and then select the most anticipated version.

Figure 12:
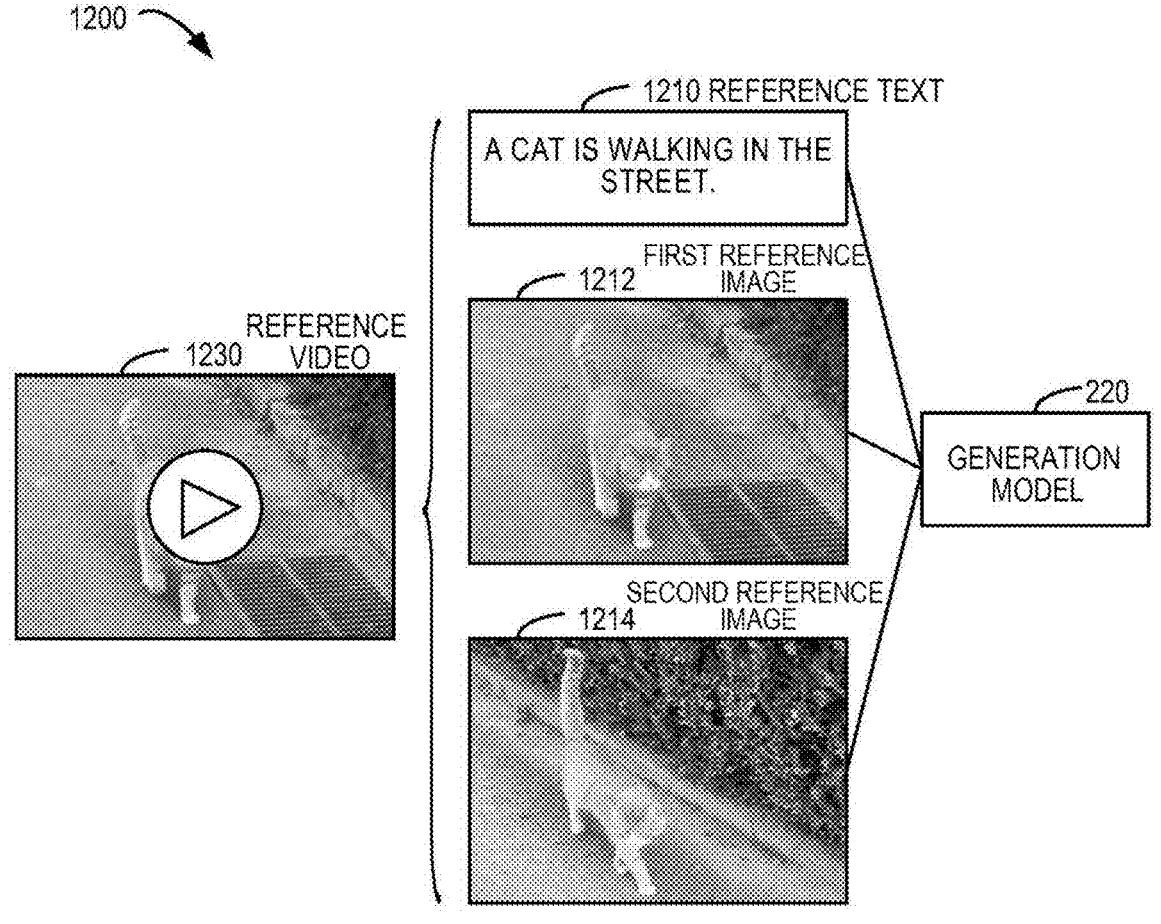
FIG. 12 shows a block diagram of a summary process for training a generation model according to some implementations of the present disclosure.

The interaction process for generating the target video by using the pre-acquired generation model has been described above, and more details about the acquisition of the generation model are provided below. According to an exemplary implementation of the present disclosure, a large number of reference videos may be used to train the generation model, and more details about a training process are described with reference to FIG. 12, which shows a block diagram 1200 of a process for determining the generation model according to some implementations of the present disclosure. As shown in FIG. 12, a generation model 220 as shown in FIG. 12 may be constructed, and the generation model 220 may describe an association relationship between input data and output data. The input data may include, for example, a text for describing a video content, a head image (for example, it may be called a first image) for representing a head image in the video, and a guide image (for example, it may be called a second image) for representing a tail image in the video. The output data may include, for example, the video.

According to an exemplary implementation of the present disclosure, the generation model 220 may be established based on various architectures currently known and/or to be developed in the future. In the training stage, sample data may be extracted from a reference video 1230 to train the generation model 220. The reference video 1230 including a plurality of reference images may be acquired, and a first reference image 1212 and a second reference image 1214 may be acquired from the plurality of reference images. Here, the first reference image 1212 (for example, a first frame image) may be acquired from a head position of the reference video 1230, and the second reference image 1214 (for example, a last frame image or an image within a predetermined range preceding the last frame image) may be acquired from a tail position of the reference video 1230. Further, a reference text 1210 for describing the content of the reference video may be received.

In an example, the reference video 1230 may include a cat, and the cats in the first reference image 1212 and the second reference image 1214 may be located at different positions in the picture. At this time, the reference text 1210 may indicate "a cat is walking in the street". Further, the generation model 220 may be trained based on the first reference image 1212, the second reference image 1214 and the reference text 1210. At this time, the trained generation model 220 may generate a target video based on the text and any of the first image and the second image.

In the process of processing the last frame instruction, various strategies may be adopted to adjust the influence of the last frame. During training, the last frame instruction may be randomly selected from the last three truth value frames of the reference video. Noise may be introduced into the instruction to improve the robustness of the model to instruction dependence. In the training stage, the last frame instruction may be randomly discarded with a certain probability. Accordingly, a simple and effective reasoning strategy is proposed. For example, in the first T denoising steps of a backward process of the diffusion model, the last frame instruction may be used to guide the video generation towards a desired end state. Then, in the remaining steps, the last frame instruction may be discarded, thereby allowing the model to generate more coherent video contents in time. The intensity of the last frame guidance may be adjusted by T.

It should be understood that FIG. 12 only schematically shows the process of acquiring the generation model 220, and alternatively and/or additionally, a plurality of reference videos may be acquired and corresponding data may be extracted from the plurality of reference videos, so as to continuously update the generation model 220 in an iterative manner. For example, the reference videos of different objects executing different actions may be acquired, such that the generation model 220 can grasp richer video generation knowledge.

With the exemplary implementation of the present disclosure, in the process of determining the generation model 220, the first reference image 1212 may be used as the head image of the video, and the second reference image 1214 may be used as guiding data to determine a development direction of a story in the video. For example, the generated video may take the second reference image 1214 as the last frame. In this way, the generation model 220 can clearly grasp changes of various image contents in the video, which is beneficial to the generation of a richer and more realistic dynamic video.

According to an exemplary implementation of the present disclosure, the first frame image instruction may set a scene of video generation (and establish a character). The first frame also enables the model to generate continuous videos. In this case, the model uses the last frame of the previous video as the first frame instruction of the subsequent video to generate the subsequent video. Further, the last frame instruction describing an end state of the video may serve as a further control mechanism. In this way, the alignment between the expectation of a user and the text can be enhanced (that is, the generated video is more in line with the expectation of the user), and the model can build complex shots, and finally generate a rich video content, thereby ensuring diversity and coherence.

In summary, the <text, first frame, last frame> instructions may be used as conditions. Given the above three instructions, the model may focus on learning the dynamics of people, animals, objects and other entities in the world in a training stage; and in reasoning, the model may "generalize" the learned movement laws of a physical world to the fields that are not involved in training, such as realizing the movement of cartoon characters, special effects shots, and the like.

Specifically, the above information may be integrated into the diffusion model. For example, text information is encoded by a pre-trained text encoder, and then embedded into the diffusion model by using a cross-attention mechanism. The image instructions are encoded by a pre-trained variational automatic encoder (VAE), and connected with a disturbed video content or Gaussian noise as an input of the diffusion model. In the training process, the first frame image of the video may be directly taken as the first frame instruction, and the model is forced to strictly follow the instruction, thereby maintaining continuity between consecutive videos. In the process of reasoning, the instruction may be conveniently acquired from the text-to-image model or directly provided by the user.

According to an exemplary implementation of the present disclosure, in order to determine the first reference image, the reference image located at the head of the reference video may be determined as the first reference image. In other words, the first frame image in the reference video may be used as the first reference image. In this way, the process of constructing training data can be simplified, and the training data is acquired in a fast and efficient manner. The second reference image may be determined based on various ways. For example, the last frame image in the reference video may be used as the second reference image. Alternatively and/or additionally, in order to introduce a disturbance factor into the training data, the second reference image may be determined from a group of reference images located within a predetermined range at the tail of the reference video.

It is assumed that the reference video 230 includes a plurality of reference images, and the predetermined range may represent the last 3 frames (or other numbers of frames) at the tail of the reference video. It is assumed that the reference video includes N image frames, any of the $N^{th}$ frame, the $(N-1)^{th}$ frame, and the $(N-2)^{th}$ frame in the reference video may be used as the second reference image. At this time, the second reference image may include any of the last three reference images. In this way, the influence of the last frame on the training process can be adjusted to some extent, so that a more coherent video can be acquired.

Figure 13:
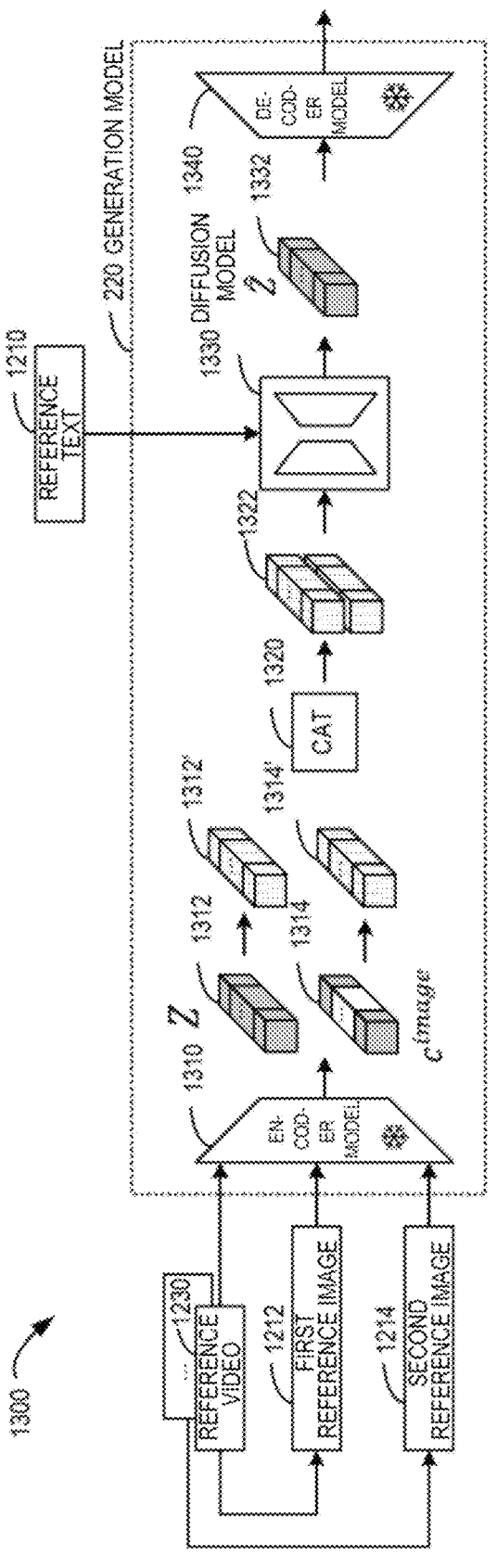
FIG. 13 shows a block diagram of a detailed process for training the generation model according to some implementations of the present disclosure.

More information about the generation model is described with reference to FIG. 13, which shows a block diagram 1300 of a process for training the generation model according to some implementations of the present disclosure. As shown in FIG. 13, the generation model 220 may include an encoder model 1310, a connection model 1320, a diffusion model 1330, and a decoder model 1340. Here, the encoder model 1310 and the decoder model 1340 may have predetermined structures and parameters. During the subsequent updating of parameters of the generation model 220, the parameters of the encoder model 1310 and the decoder model 1340 will not be updated. According to an exemplary implementation of the present disclosure, a VAE and a corresponding decoder may be used.

In FIG. 13, the generation model 220 may be acquired based on the first reference image 1212, the second reference image 1214 and the reference text 1210. Specifically, the encoder model 1310 may be used to determine a first reference feature 1312 (for example, denoted as Z) of the reference video 1230, and the first reference feature 1312 may include a plurality of reference image features of a plurality of reference images. Further, the encoder model 1310 may be used to determine a second reference feature 1314 (for example, denoted as $c^{image}$) of the reference video, and the second reference feature includes a first reference image feature of the first reference image and a second reference image feature of the second reference image.

According to an exemplary implementation of the present disclosure, the first reference feature 1312 may include a plurality of dimensions, and each dimension may correspond to one reference image, that is, the feature from one reference image (having a predetermined dimension, for example, $\mathbb{R}^{C*H*W}$, wherein C represents the number of channels, H represents an image height, and W represents an image width) may be stored at each dimension. The first reference feature and the second reference feature may have the same dimension. At this time, the number of dimensions is equal to the number of images in the reference video. For example, it may be specified that the reference video includes 16 (or other numbers) images.

Figure 14:
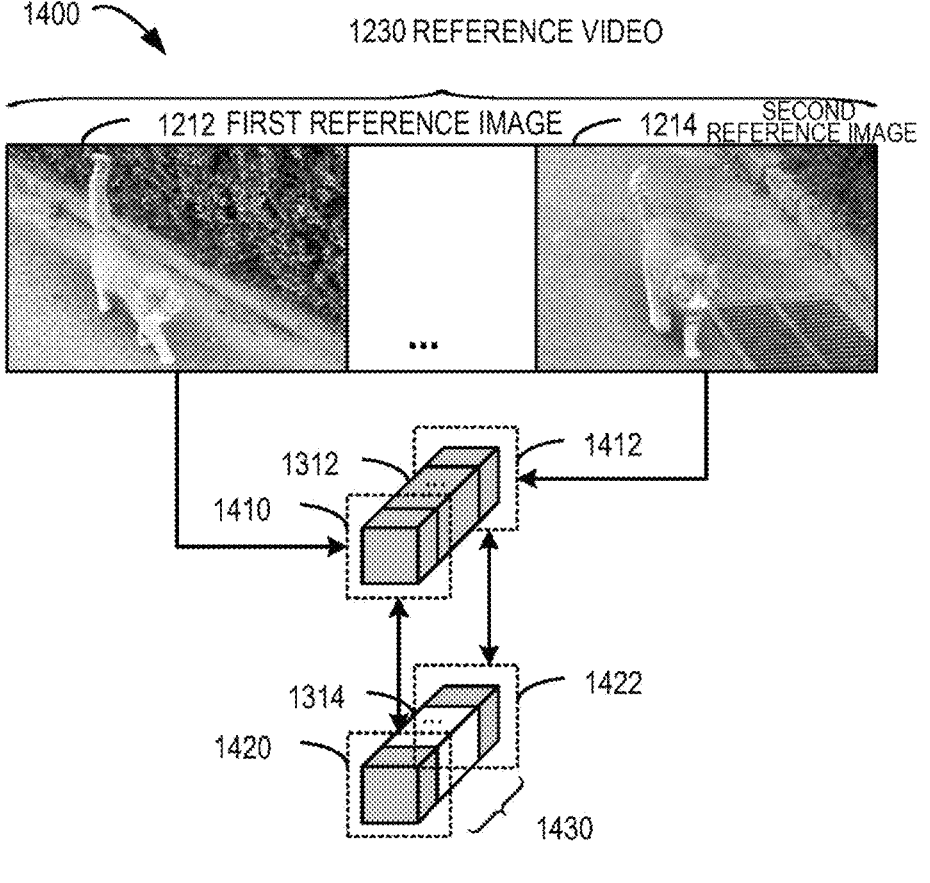
FIG. 14 shows a block diagram of a process for determining a reference feature of a reference video according to some implementations of the present disclosure.

More details about feature determination are described with reference to FIG. 14, which shows a block diagram 1400 of a process of determining the reference feature of the reference video according to some implementations of the present disclosure. As shown in FIG. 14, respective reference images in the reference video 1230 may be processed one by one. For example, the feature of the first reference image 1212 may be extracted by using the encoder model to generate the first reference image feature. The first reference image feature may be placed at a first position (i.e., position 1410) of the first reference feature 1312. Then, the reference image feature of another reference image subsequent to the first reference image 1212 may be extracted by using the encoder model, and this reference image feature is placed at a second position of the first reference feature 1312, and so on. Respective reference images in the reference video 1230 may be continuously processed until the second reference feature of the last reference image (i.e., the second reference image 1214) in the reference video 1230 is placed at the last position (i.e., position 1412) of the first reference feature 1312.

Similarly, the encoder model 1310 may be used to determine the second reference feature of the reference video. The encoder model 1310 may be used to extract the feature of the first reference image 1212 in order to generate the first reference image feature. The first reference image feature may be placed at the first position (i.e., the position 1420) of the second reference feature 1314. The encoder model 1310 may be used to place the second reference image feature of the last reference image (i.e., the second reference image 1214) in the reference video 1230, at the last position 1422 of the second reference feature 1314.

As shown in FIG. 14, the position (i.e., the first position) of the first reference image feature in the first reference feature 1312 corresponds to the position (i.e., the first position) of the first reference image in the reference video, and the position (i.e., the last position) of the second reference image feature in the second reference feature 1314 corresponds to the position (i.e., the last position) of the second reference image in the reference video. In this way, it is convenient to align the first reference feature and the second reference feature in a subsequent connection process, thereby facilitating the improvement of the accuracy of the diffusion model.

According to an exemplary implementation of the present disclosure, the features at positions other than the first position and the second position in the second reference feature may be set to be empty. Specifically, position 1430 in FIG. 14 may be set to be empty, for example, data "0" may be filled. In this way, the second reference feature can adjust an influence of the first reference image and the second reference image on the video generation process, so that the generation model can learn more knowledge about a transformation relationship between the first reference image and the second reference image.

Specifically, the reference video may be encoded with the VAE and the first reference feature 1312 is acquired, that is, each frame in the reference video is encoded with the VAE respectively. The VAE may be used to encode the first reference image and the second reference image, and then positions of intermediate frames are completed with 0, so as to obtain the second reference feature 1314 (the dimension is the same as that of the first reference feature 1312).

Returning to FIG. 13, the diffusion model 1330 may be determined based on the first reference feature 1312, the second reference feature 1314, and the reference text 1210. Specifically, based on principles of the diffusion model, noise may be added to the first reference feature 1312 and the second reference feature 1314 respectively (for example, different levels of noise may be added to the two features in different ways), so as to generate a first noise reference feature 1312' and a second noise reference feature 1314'. Further, the connection model 1320 may be used to connect the first noise reference feature 1312' and the second noise reference feature 1314' and generate a noise reference feature 1322. Further, corresponding training data may be constructed based on the principles of the diffusion model, and then parameters of the diffusion model 1330 are updated.

According to an exemplary implementation of the present disclosure, the diffusion model 1330 may be implemented based on various structures currently known and/or to be developed in the future. A diffusion process of the diffusion model 1330 involves a forward noising process and a backward denoising process. In the forward noising process, noise data may be added to the feature in multiple steps respectively. For example, the initial feature may be expressed as Z_0. In each step, the noise data may be added continuously. The noise feature of step t may be expressed as Z_t, and the noise feature of step t+1 may be expressed as Z_(t+1). For example, the noise data may be added to Z_t at step t. Then, at step T, random Gaussian data may be acquired.

In the backward denoising process, an inverse process of the above noising process may be executed in multiple steps, so as to gradually acquire the initial feature. Specifically, the random Gaussian data, the reference text and the corresponding second reference feature may be input into the diffusion model, so that the denoising process is executed step by step in multiple steps. For example, part of the noise in the noise feature Z_t may be removed in the $t^{th}$ step, so as to form a cleaner noise feature Z_(t−1) relative to the noise feature Z_t. Each denoising process may be executed in an iterative manner, so that the initial feature (i.e., the video feature without the added noise) is derived backwardly.

According to an exemplary implementation of the present disclosure, in the process of determining the diffusion model, the diffusion model 1330 is used to determine a reconstruction feature 1332 (for example, denoted as $\hat{Z}$) of the reference video based on the noise reference feature 1322 and the reference text 1210. Further, a loss function is constructed based on a difference between the reconstruction feature and the reference feature, and then the diffusion model 1330 is updated by using the loss function.

According to an exemplary implementation of the present disclosure, a 2D UNet (U-type network) may be adopted to implement the diffusion model. The model may be constructed by spatial down-sampling followed by spatial up-sampling through inserting jump connections. Specifically, the model may include two basic blocks, i.e., a 2D convolution block and 2D attention. The 2D UNet is extended to 3D by inserting a temporal layer, wherein a 1D convolution layer is behind a 2D convolution layer along a temporal dimension and a 1D attention layer is behind a 2D attention layer along the temporal dimension. The model may be trained together with the images and videos to maintain a high-fidelity spatial generation ability and disable 1D time operation of image input. Bidirectional self-attention may be used in all attention levels. The pre-trained text encoder is used to encode the text instructions, and the embedded $c^{text}$ is injected through a cross-attention layer in the UNet, with the hidden state as a query and the $c^{text}$ as a key and value.

With regard to injection of the image instructions, the image instructions of the first frame and the last frame may be combined with text guidance. Given the image instructions on the first frame and the last frame, for example, expressed as $\{I^{first}, I^{last}\}$, the above representation may be encoded into the same hidden space as an input space of the diffusion model to generate $\{f^{first}, f^{last}\}$, wherein $f \in R^{C*H*W}$. In order to insert the instructions without losing time and position information, the final image condition then may be constructed as $c^{image} = [f^{first}, \text{PADs}, f^{last}] \in \mathbb{R}^{F*C*H*W}$ wherein $\text{PADs} \in \mathbb{R}^{(F-2)*C*H*W}$. The condition $c^{image}$ is then connected with the noised hidden feature $z_t$ along a channel dimension, which is used as the input of the diffusion model.

According to an exemplary implementation of the present disclosure, the first reference image, the second reference image and the reference text may be determined from a large number of reference videos, and then the first reference feature Z, the second reference feature $c^{image}$ and the corresponding reconstruction feature $\hat{Z}$ of each reference video are determined in the manner described above. Here, the reconstruction feature is determined by the diffusion model 1330 and includes an influence of the forward noising process. At this time, the loss function may be constructed based on the difference between the first reference feature Z and the corresponding reconstruction feature $\hat{Z}$.

The diffusion model 1330 may be continuously updated in an iterative manner with a large number of reference videos until expected stopping conditions are met. It should be understood that there is no need to manually label data in this process, but the first frame and the last frame of the reference video and the corresponding text description may be directly used as training data. In this way, the workload of acquiring manually labeled data can be eliminated, thereby improving the efficiency of acquiring the generation model 220.

It should be understood that although the above shows an example in which the second reference feature $c^{image}$ includes relevant feature information of both the first reference image and the second reference image, alternatively and/or additionally, in some cases, the second reference feature $c^{image}$ may only include the feature information of the first reference image. Specifically, the second reference image feature in the second reference features may be set to be empty according to a predetermined condition. In other words, the feature at position 1422 may be removed in FIG. 14, for example, the value at this position may be set to 0.

With the exemplary implementation of the present disclosure, the second reference image feature may be removed according to a predetermined ratio (for example, 25% or other numerical values). In this way, the application scene not considering the second reference image can be involved in the process of updating the generation model, so that the generation model can be adapted to more application scenes, thereby improving the accuracy of the generation model in various cases.

According to an exemplary implementation of the present disclosure, the generation model 220 may be trained based on various ways currently known and/or to be developed in the future, so that the generation model 220 can grasp an association relationship between the first image, the second image, the text describing the video content and the corresponding video.

According to an exemplary implementation of the present disclosure, the generation model 230 further includes the decoder model 1340. After the generation model 220 has been acquired, a demand on video generation may be input to the generation model 220, thereby generating a corresponding target video. According to an exemplary implementation of the present disclosure, the first image and the text may be input to the generation model, and then the corresponding target video is generated by using the generation model. According to an exemplary implementation of the present disclosure, the first image, the second image and the text may be input to the generation model, and then the corresponding target video is generated by using the generation model. Alternatively and/or additionally, the text may even be empty, and the target video may still be generated.

In order to acquire a more anticipated target video, the first image and the second image for generating the target video and the text describing the content of the target video may be received. Then, according to the well-trained diffusion model, the reconstruction feature of the target video may be generated based on the first image, the second image and the text. Further, the target video may be generated based on the reconstruction feature according to the decoder model. In this way, the diffusion model 1330 can be fully used to execute the backward denoising process, thereby acquiring the reconstruction feature of the target video in a more accurate way.

Figure 15:
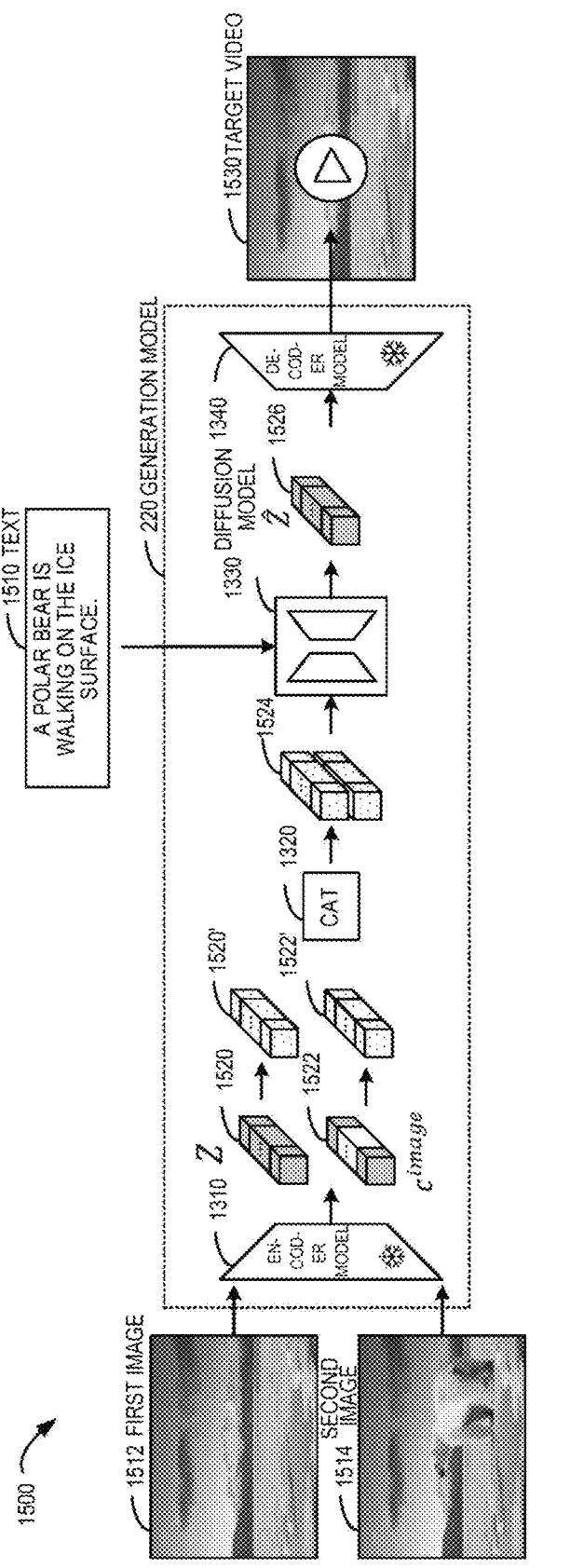
FIG. 15 shows a block diagram of a process for generating a target video according to some implementations of the present disclosure.

More details about video generation are described with reference to FIG. 15, which shows a block diagram 1500 of a process for generating a target video according to some implementations of the present disclosure. As shown in FIG. 15, a first image 1512, a second image 1514, and a text 1510 for describing an image content may be received. Here, the first image 1512 may include, for example, an ice surface, so as to be used as the first frame of a target video 1530 to be generated. The second image 1514 may include, for example, an ice surface and a polar bear on the ice surface. The second image 1514 may be used as guidance information to generate the last frame of the target video 1530. At this time, the generation model 220 will generate the target video 1530 under the condition of the text 1510, and the content of the video is "a polar bear is walking on the ice surface".

The first image 1512, the second image 1514, and the text 1510 may be input to the generation model 220. At this time, the generation model 220 will output the target video 1530, the first frame of the target video 1530 corresponds to the first image 1512 and the last frame of the target video 1530 corresponds to the second image 1514. It should be understood that since the target video 1530 has not been generated at this time, the noise feature is used as a first feature 1520 of the target video 1530. According to an exemplary implementation of the present disclosure, the first feature 1520 may be determined by using a Gaussian noise.

Further, a second feature 1522 of the target video 1530 may be generated based on the first image 1512 and the second image 1514 according to the encoder model 1310. For example, the encoder model 1310 may be used to determine a first image feature of the first image 1512 and a second image feature of the second image 1514 respectively. Then, the first image feature may be placed at the first position of the second feature 1522 and the second image feature may be placed at the tail position of the second feature 1522. It should be understood that the process of generating the second feature 1522 here is similar to that in the training stage, and is thus not repeated here.

When the first feature 1520 and the second feature 1522 have been determined, a reconstruction feature 1526 of the target video may be acquired by using the first feature 1520, the second feature 1522 and the text 1510 according to the diffusion model. By a process similar to the process of determining the reconstruction feature in the training stage, a first noise feature 1520' and a second noise feature 1522' may be acquired, and the first noise feature 1520' and the second noise feature 1522' are connected by using the connection model 1320 to form a noise feature 1524. Further, the backward denoising stage of the diffusion model 1330 may be used to generate the reconstruction feature 1526.

It should be understood that since the diffusion model 1330 has been trained based on the above loss function, the reconstruction feature 1526 generated by the diffusion model 1330 at this time can accurately describe information of all aspects of the target video 1530. Further, the reconstruction feature 1526 may be input to the decoder model 1340, at this time, the decoder model 1340 will output the corresponding target video 1530, and the target video 1530 will be accurately matched with the first image 1512, the second image 1514 and the text 1510 in the input data.

It should be understood that in the process of generating a video, the backward denoising process of the diffusion model 1330 may be executed in an iterative manner. The backward denoising process may be iteratively executed in a plurality of steps. It is assumed that the total number of the plurality of steps is T, then in a first step (t=1), the reconstruction feature 1526 of the target video may be acquired by using the first feature 1520, the second feature 1522 and the text 1510.

Then, in a second step (t=2) after the first step in the plurality of steps, the first feature may be set as the reconstruction feature of the target video, that is, Z is used to replace Z, thereby performing subsequent processing. In the second step, the diffusion model may use the first feature, the second feature and the text to acquire a new reconstruction feature. In a subsequent third step (t=3), similar processing may be executed until the predetermined $T^{th}$ step is reached. At this time, the backward denoising process is ended, and the output reconstruction feature is a feature describing the target video 1530 to be generated. With the exemplary implementation of the present disclosure, the noise may be gradually removed in the plurality of backward denoising steps, and the more accurate reconstruction feature is generated.

According to an exemplary implementation of the present disclosure, in the process of generating a target video, a user is allowed to specify the degree of influence of the second image. For example, a control for inputting an influencing factor may be provided on the page, where the influencing factor may be expressed, for example, in percentage. A plurality of steps for calling a diffusion model in the generation model may be divided into a first stage and a second stage based on the influencing factor. In the first stage and the second stage, the diffusion model may determine a reconstruction feature of the target video based on the first image and the second image, and then, the decoder model in the generation model may generate the target video based on the reconstruction feature. With the exemplary implementations of the present disclosure, the degree of influence of the second image 1514 can be controlled by using the influencing factor.

Specifically, in each step in the first stage, the guiding function of the second image 1514 may be considered; and in each step in the second stage, the guiding function of the second image 1514 may not be considered. In the process of determining the reconstruction feature of the target video, in the first stage, the diffusion model determines an intermediate reconstruction feature associated with the target video based on the first image and the second image; and in the second stage, the diffusion model determines the reconstruction feature based on the first image and the intermediate reconstruction feature. In other words, the influence of the second image 1514 may be removed from the second feature in the second stage, that is, the part of the second feature corresponding to the second image is set to be empty. In FIG. 15, the feature located at the last position in the second feature 1522 may be set to 0.

Specifically, in the first τ steps of all T denoising steps, the last frame condition may be applied to guide the video generation towards a desired end state, and the last frame condition is discarded in the subsequent steps to generate a more credible and temporally consistent video:

$$\hat{x}_\theta = \begin{cases} \hat{x}_\theta\left(z_t, f^{first}, f^{last}, c^{text}\right), \text{ if } t < \tau \\ \hat{x}_\theta\left(z_t, f^{first}, c^{text}\right), \text{ if } 0 \leq \tau \leq T \end{cases} \qquad \text{Formula 1}$$

In the above formula, τ determines a dependence degree of the model on the last frame instruction, and various applications can be adapted by adjusting τ. For example, this model can generate a high-quality video without the last frame condition (i.e., τ=0). In addition, classifier-free guidance may be applied, which mixes the model score estimation under the conditions of text prompt and text-free prompt.

According to an exemplary implementation of the present disclosure, the number of steps not considering the second image 1514 may be determined according to a predetermined ratio. For example, in the step of τ=T*40% (or other numerical values) in all T steps, the influence of the second image 1514 may not be considered. It is assumed that T=50, then the complete second feature 1522 is used in the first 30 (50*(1−40%)) steps; and further in the next 20 (50*40%) steps, the value at the last position in the second feature 1522 may be set to 0. In this way, the functions of the first image 1512 and the text 1510 in generating the target video can be adjusted, so that the generated target video 1530 is more in line with expectations.

In summary, according to an exemplary implementation of the present disclosure, a new video generation architecture PixelDance based on the diffusion model is proposed, and this architecture combines the image instructions of the first frame and the last frame and text guidance. The corresponding training process and reasoning process can be realized based on the PixelDance architecture. With the exemplary implementation of the present disclosure, flexible control over the video generation process and last frame guidance of different intensities can be provided.

The proposed technical solution may be executed on a variety of data sets, and experiments show that the video generated by the PixelDance has strong advantages in the aspects of synthesizing complex scenes and/or actions. Specifically, the generation model can be trained by using various available data sets, each video in the data sets is associated with a paired text, and the text usually provides a rough description and shows a weak correlation with the video contents. Since the image instructions are helpful to learn complex video distribution, the PixelDance can make full use of various data sets without labeling data, which shows excellent ability in generation of the videos with complex scenes and movements.

Exemplary Process

Figure 16:
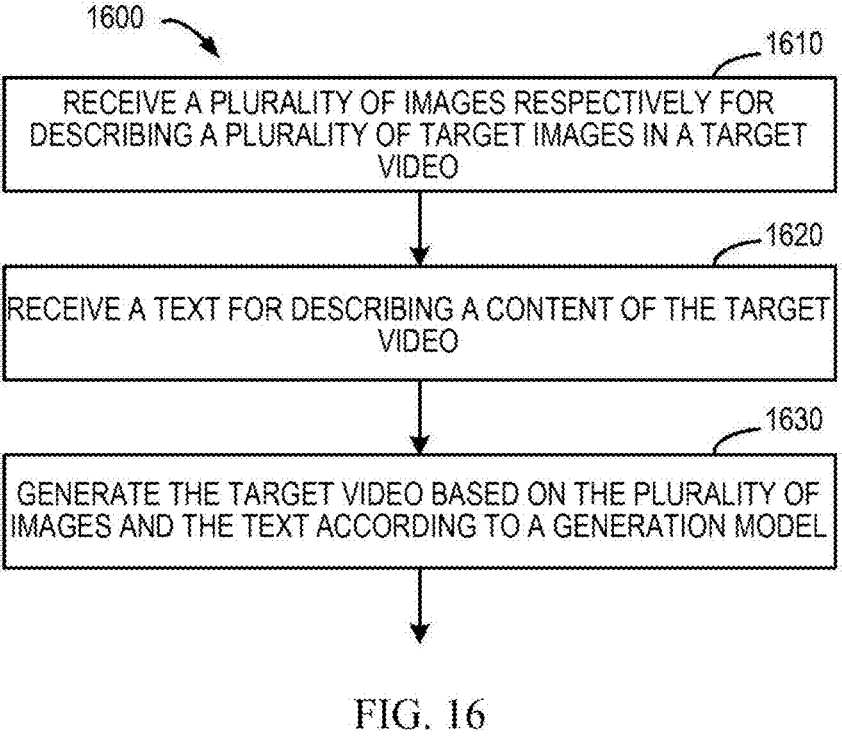
FIG. 16 shows a flowchart of a method for generating a video according to some implementations of the present disclosure.

FIG. 16 shows a flowchart of a method 1600 for generating a video according to some implementations of the present disclosure. At block 1610, an image for describing at least any of a head image and a tail image of a target video is received. At block 1620, a text for describing a content of the target video is received. At block 1630, the target video is generated based on the images and the text according to a generation model.

According to an exemplary implementation of the present disclosure, the plurality of images includes a first image for describing a head image in the plurality of target images, and a second image for describing a tail image in the plurality of target images.

According to an exemplary implementation of the present disclosure, the second image is received via at least any of: an import control for importing an address of the second image; a draw control for drawing the second image; or an edit control for editing the first image to generate the second image.

According to an exemplary implementation of the present disclosure, the method further includes: providing a plurality of images in the target video; determining, in response to receiving an interaction for a third image in the plurality of images, a head image for describing a further target video subsequent to the target video; acquiring a further text for describing a content of the further target video, and a fourth image for describing a tail image of the further target video; and generating the further target video based on the third image, the fourth image and the further text according to the generation model.

According to an exemplary implementation of the present disclosure, the images and the text are determined by: receiving a plurality of images for respectively describing a plurality of keyframes in a long video; receiving a long text for describing a content of the long video; and determining the images and the text based on the plurality of images and the long text according to a machine learning model.

According to an exemplary implementation of the present disclosure, the images and the text are determined by: receiving a summary text for describing a long video; determining a plurality of texts for respectively describing contents of a plurality of video clips in the long video based on the summary text according to a machine learning model; generating a target image based on a target text in the plurality of texts according to the machine learning model; and taking the target image as the images and the target text as the text.

According to an exemplary implementation of the present disclosure, the method further includes: determining prompt information associated with a further target video subsequent to the target video based on the target video according to a machine learning model, where the prompt information includes at least one image and a further text; and generating the further target video based on the at least one image and the further text according to the generation model.

According to an exemplary implementation of the present disclosure, generating the target video further includes: receiving an influencing factor for specifying a degree of influence of the second image; dividing, based on the influencing factor, a plurality of steps for calling a diffusion model in the generation model into a first stage and a second stage; determining, in the first stage and the second stage, a reconstruction feature of the target video based on the first image and the second image according to the diffusion model; and generating the target video based on the reconstruction feature by using a decoder model in the generation model.

According to an exemplary implementation of the present disclosure, determining the reconstruction feature of the target video includes: determining, in the first stage, an intermediate reconstruction feature associated with the target video based on the first image and the second image according to the diffusion model; and determining, in the second stage, the reconstruction feature based on the first image and the intermediate reconstruction feature according to the diffusion model.

According to an exemplary implementation of the present disclosure, the generation model is determined by: determining a first reference image and a second reference image from a plurality of reference images in a reference video; receiving a reference text for describing the reference video; and acquiring the generation model based on the first reference image, the second reference image and the reference text, where the generation model is configured to generate the target video based on the text and any of the first image and the second image.

According to an exemplary implementation of the present disclosure, the first reference image is located at the head of the reference video, and the second reference image is located within a predetermined range at the tail of the reference video.

According to an exemplary implementation of the present disclosure, the generation model includes an encoder model and a diffusion model, and acquiring the generation model based on the first reference image, the second reference image and the reference text includes: determining a first reference feature of the reference video by using the encoder model, wherein the first reference feature includes a plurality of reference image features of the plurality of reference images; determining a second reference feature of the reference video by using the encoder model, wherein the second reference feature includes a first reference image feature of the first reference image and a second reference image feature of the second reference image; and determining the diffusion model based on the first reference feature, the second reference feature, and the reference text.

According to an exemplary implementation of the present disclosure, a first position of the first reference image feature in the second reference feature corresponds to a position of the first reference image in the reference video, and a second position of the second reference image feature in the second reference feature corresponds to a position of the second reference image in the reference video.

According to an exemplary implementation of the present disclosure, a dimension of the second reference feature is equal to a dimension of the first reference feature, and features at positions other than the first position and the second position in the second reference feature are set to be empty.

According to an exemplary implementation of the present disclosure, the method further includes: setting the second reference image feature to be empty according to a predetermined condition.

According to an exemplary implementation of the present disclosure, determining the diffusion model based on the first reference feature, the second reference feature, and the reference text includes: performing noising processing for the first reference feature and the second reference feature respectively to generate a first noise reference feature and a second noise reference feature; connecting the first noise reference feature and the second noise reference feature to generate a noise reference feature of the reference video; determining a reconstruction feature of the reference video based on the noise reference feature and the reference text by using the diffusion model; and updating the diffusion model based on a difference between the reconstruction feature and the reference feature.

According to an exemplary implementation of the present disclosure, the head image is a first image frame in the target video, and the tail image is a last image frame in the target video.

Exemplary Apparatus and Device

Figure 17:
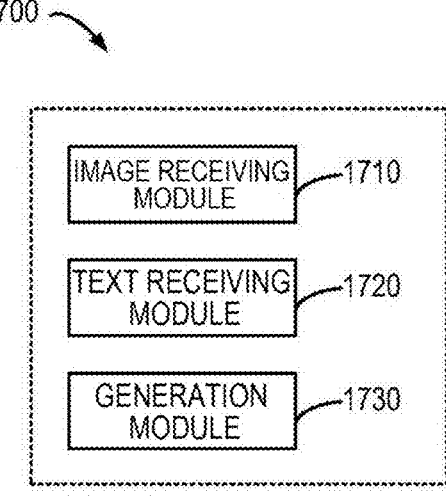
FIG. 17 shows a block diagram of an apparatus for generating a video according to some implementations of the present disclosure.

FIG. 17 shows a block diagram of an apparatus 1700 for generating a video according to some implementations of the present disclosure. The apparatus 1700 includes: an image receiving module 1710 configured to receive a plurality of images for respectively describing a plurality of target images in the target video; a text receiving module 1720 configured to receive a text for describing a content of the target video; and a generation module 1730 configured to generate the target video based on the plurality of images and the text according to a generation model.

According to an exemplary implementation of the present disclosure, the plurality of images includes a first image for describing a head image in the plurality of target images, and a second image for describing a tail image in the plurality of target images.

According to an exemplary implementation of the present disclosure, the second image is received via at least any of: an import control for importing an address of the second image; a draw control for drawing the second image; or an edit control for editing the first image to generate the second image.

According to an exemplary implementation of the present disclosure, the apparatus further includes: a providing module configured to provide a plurality of images in the target video; a determination module configured to determine, in response to receiving an interaction for a third image in the plurality of images, a head image for describing a further target video subsequent to the target video; an acquisition module configured to acquire a further text for describing a content of the further target video, and a fourth image for describing a tail image of the further target video; and a generation module configured to generate the further target video based on the third image, the fourth image and the further text according to the generation model.

According to an exemplary implementation of the present disclosure, the apparatus further includes: a keyframe receiving module configured to receive a plurality of images for respectively describing a plurality of keyframes in a long video; a long text receiving module configured to receive a long text for describing a content of the long video; and a first invocation module configured to determine the images and the text based on the plurality of images and the long text according to a machine learning model.

According to an exemplary implementation of the present disclosure, the apparatus further includes: a summary receiving module configured to receive a summary text for describing a long video; a second invocation module configured to determine a plurality of texts for respectively describing contents of a plurality of video clips in the long video based on the summary text according to the machine learning model; a third invocation module configured to generate a target image based on a target text in the plurality of texts according to the machine learning model; and an identification module configured to take the target image as the images and the target text as the text.

According to an exemplary implementation of the present disclosure, the apparatus further includes: a fourth invocation module configured to determine prompt information associated with a further target video subsequent to the target video based on the target video according to a machine learning model, where the prompt information includes at least one image and a further text; and the generation module is further configured to generate the further target video based on the at least one image and the further text according to the generation model.

According to an exemplary implementation of the present disclosure, the generation module further includes: an influencing factor receiving module configured to receive an influencing factor for specifying a degree of influence of the second image; and a division module configured to divide, based on the influencing factor, a plurality of steps for calling a diffusion model in the generation model into a first stage and a second stage; a reconstruction module configured to determine, in the first stage and the second stage, a reconstruction feature of the target video based on the first image and the second image according to the diffusion model; and a video generation module configured to generate the target video based on the reconstruction feature by using a decoder model in the generation model.

According to an exemplary implementation of the present disclosure, the reconstruction module includes: a first determination module configured to determine, in the first stage, an intermediate reconstruction feature associated with the target video based on the first image and the second image according to the diffusion model; and a second determination module configured to determine, in the second stage, the reconstruction feature based on the first image and the intermediate reconstruction feature according to the diffusion model.

According to an exemplary implementation of the present disclosure, a model determination module is further included and is configured to determine the generation model. The model determination module includes: an image determination module configured to determine a first reference image and a second reference image from a plurality of reference images in a reference video; a text receiving module configured to receive a reference text for describing the reference video; and a model acquisition module configured to acquire the generation model based on the first reference image, the second reference image and the reference text, where the generation model is configured to generate the target video based on the text and any of the first image and the second image.

According to an exemplary implementation of the present disclosure, the first reference image is located at the head of the reference video, and the second reference image is located within a predetermined range at the tail of the reference video.

According to an exemplary implementation of the present disclosure, the generation model includes an encoder model and a diffusion model, and the model acquisition module includes: a first feature determination module configured to determine a first reference feature of the reference video by using the encoder model, where the first reference feature includes a plurality of reference image features of the plurality of reference images; a second feature determination module configured to determine a second reference feature of the reference video by using the encoder model, where the second reference feature includes a first reference image feature of the first reference image and a second reference image feature of the second reference image; and a diffusion model determination module configured to determine the diffusion model based on the first reference feature, the second reference feature, and the reference text.

According to an exemplary implementation of the present disclosure, a first position of the first reference image feature in the second reference feature corresponds to a position of the first reference image in the reference video, and a second position of the second reference image feature in the second reference feature corresponds to a position of the second reference image in the reference video.

According to an exemplary implementation of the present disclosure, a dimension of the second reference feature is equal to a dimension of the first reference feature, and features at positions other than the first position and the second position in the second reference feature are set to be empty.

According to an exemplary implementation of the present disclosure, the apparatus further includes: a setting module configured to set the second reference image feature to be empty according to a predetermined condition.

According to an exemplary implementation of the present disclosure, the diffusion model determination module includes: a noising module configured to execute noising processing for the first reference feature and the second reference feature respectively to generate a first noise reference feature and a second noise reference feature; a connection module configured to connect the first noise reference feature and the second noise reference feature to generate a noise reference feature of the reference video; a reconstruction module configured to determine a reconstruction feature of the reference video based on the noise reference feature and the reference text by using the diffusion model; and an updating module configured to update the diffusion model based on a difference between the reconstruction feature and the reference feature.

According to an exemplary implementation of the present disclosure, the head image is a first image frame in the target video, and the tail image is a last image frame in the target video.

Figure 18:
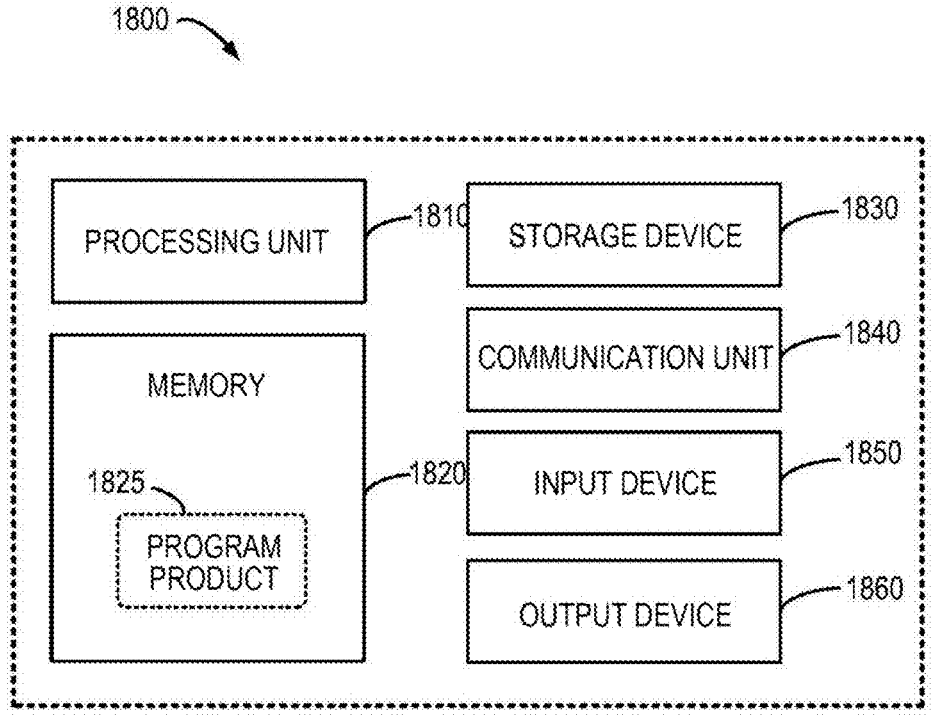
FIG. 18 shows a block diagram of a device capable of implementing a plurality of implementations of the present disclosure.

FIG. 18 shows a block diagram of a device 1800 capable of implementing multiple implementations of the present disclosure. It should be understood that the computing device 1800 shown in FIG. 18 is merely exemplary and should not constitute any limitation on the functions and scope of the implementations described herein. The computing device 1800 shown in FIG. 18 may be used to implement the method described above.

As shown in FIG. 18, the computing device 1800 is in the form of a general-purpose computing device. Components of the computing device 1800 may include, but are not limited to, one or more processors or processing units 1810, a memory 1820, a storage device 1830, one or more communication units 1840, one or more input devices 1850, and one or more output devices 1860. The processing unit 1810 may be an actual or virtual processor and can execute various processing according to programs stored in the memory 1820. In a multiprocessor system, multiple processing units execute computer-executable instructions in parallel to improve a parallel processing capability of the computing device 1800.

The computing device 1800 typically includes multiple computer storage mediums. Such mediums may be any available mediums accessible by the computing device 1800, and include but are not limited to volatile and nonvolatile mediums, and removable and non-removable mediums. The memory 1820 may be a volatile memory (such as a register, a cache and a random access memory (RAM)), a nonvolatile memory (such as a read-only memory (ROM), an electrically erasable programmable read-only memory (EEPROM) and a flash memory) or some combinations thereof. The storage device 1830 may be a removable or non-removable medium and may include a machine-readable medium, such as a flash drive, a magnetic disk or any other mediums, which can be used to store information and/or data (such as training data for training) and may be accessed within the computing device 1800.

The computing device 1800 may further include additional removable/non-removable, volatile/nonvolatile storage mediums. Although not shown in FIG. 18, a disk drive for reading from or writing into a removable and nonvolatile magnetic disk (such as a "floppy disk") and an optical disk drive for reading from or writing into a removable and nonvolatile optical disk may be provided. In these cases, each drive may be connected to a bus (not shown) by one or more data medium interfaces. The memory 1820 may include a computer program product 1825 having one or more program modules configured to execute various methods or actions according to various implementations of the present disclosure.

The communication unit 1840 realizes communication with other computing devices through a communication medium. Additionally, functions of the components of the computing device 1800 may be realized in a single computing cluster or a plurality of computing machines, and these computing machines can communicate through communication connections. Therefore, the computing device 1800 can operate in a networked environment by using logical connections with one or more other servers, a network personal computer (PC) or another network node.

The input device 1850 may be one or more input devices, such as a mouse, a keyboard and a trackball. The output device 1860 may be one or more output devices, such as a display, a speaker and a printer. The computing device 1800 may also communicate with one or more external devices (not shown), such as storage devices and display devices, through the communication unit 1840 as needed, communicate with one or more devices that enable users to interact with the computing device 1800, or communicate with any devices (such as network cards and modems) that enable the computing device 1800 to communicate with one or more other computing devices. Such communication may be executed via an input/output (I/O) interface (not shown).

According to an exemplary implementation of the present disclosure, a computer-readable storage medium is provided and has computer-executable instructions stored thereon, wherein the computer-executable instructions are executed by a processor to implement the method described above. According to an exemplary implementation of the present disclosure, a computer program product is also provided, is tangibly stored on a non-transitory computer-readable medium, and includes computer-executable instructions, which are executed by a processor to implement the method described above. According to an exemplary implementation of the present disclosure, a computer program product is provided and has a computer program stored thereon, which, when executed by a processor, implements the method described above.

Various aspects of the present disclosure are described herein with reference to the flowcharts and/or block diagrams of the method, apparatus, device and computer program product implemented according to the present disclosure. It should be understood that each block of the flowcharts and/or block diagrams and combinations of various blocks in the flowcharts and/or block diagrams may be realized by computer-readable program instructions.

These computer-readable program instructions may be provided to the processing unit of a general-purpose computer, a special-purpose computer or other programmable data processing apparatus to produce a machine, so that these instructions, when executed by the processing unit of the computer or other programmable data processing apparatus, produce the apparatus realizing the functions/actions specified in one or more blocks in the flowcharts and/or block diagrams. These computer-readable program instructions may also be stored in a computer-readable storage medium, and these instructions enable the computer, the programmable data processing apparatus and/or other devices to work in a particular manner, so that the computer-readable medium having the instructions stored includes an article of manufacture including the instructions realizing various aspects of the functions/actions specified in one or more blocks in the flowcharts and/or block diagrams.

The computer-readable program instructions may be loaded onto the computer, other programmable data processing apparatuses, or other devices, such that a series of operation steps are executed on the computer, other programmable data processing apparatuses, or other devices to produce a computer-implemented process. Therefore, the instructions executed on the computer, other programmable data processing apparatuses, or other devices realize the functions/actions specified in one or more blocks in the flowcharts and/or block diagrams.

The flowcharts and block diagrams in the figures show possibly realized architectures, functions and operations of systems, methods and computer program products according to multiple implementations of the present disclosure. In this regard, each block in the flowcharts or block diagrams may represent a module, a program segment or a part of instruction, and the module, the program segment or the part of instruction contains one or more executable instructions for realizing specified logical functions. In some alternative implementations, the functions noted in the blocks may also occur in a different order than those noted in the figures. For example, two consecutive blocks may be actually executed substantially in parallel, and sometimes they may be executed in a reverse order, depending on the functions involved. It should also be noted that each block in the block diagrams and/or flowcharts and combinations of the blocks in the block diagrams and/or flowcharts may be realized by a dedicated hardware-based system executing specified functions or actions, or may be realized by a combination of dedicated hardware and computer instructions.

Various implementations of the present disclosure have been described above, and the above descriptions are exemplary, are not exhaustive, and are not limited to the disclosed various implementations. Many modifications and changes will be obvious to those ordinary skilled in the art without departing from the scope and spirit of the described various implementations. The terminology used herein is chosen to best explain principles of various implementations, practical application or improvement to technologies in the market, or to enable other ordinary skilled in the art to understand various implementations disclosed herein.

The invention claimed is:

1. A method for generating a video, comprising:

receiving a first plurality of images for respectively describing a plurality of target images in a target video, wherein the first plurality of images comprises a first image for describing a first head image in the plurality of target images, and a second image for describing a first tail image in the plurality of target images;

receiving a text for describing a content of the target video; and generating the target video based on the first plurality of images and the text according to a generation model, wherein the generating the target video comprises:

determining a feature for generating the target video, a first image feature of the first image being placed at a first position of the feature for generating the target video and a second image feature of the second image being placed at a tail position of the feature for generating the target video; and generating the target video based on the feature for generating the target video and the text.

2. The method according to claim 1, wherein the second image is received via at least any of:

an import control for importing an address of the second image;

a draw control for drawing the second image; or an edit control for editing the first image to generate the second image.

3. The method according to claim 1, further comprising:

providing a second plurality of images in the target video;

in response to receiving an interaction for a third image in the second plurality of images, determining a second head image for describing a further target video subsequent to the target video;

acquiring a further text for describing a content of the further target video, and a fourth image for describing a second tail image of the further target video; and generating the further target video based on the third image, the fourth image and the further text according to the generation model.

4. The method according to claim 1, wherein the images and the text are determined by:

receiving a plurality of images for respectively describing a plurality of keyframes in a video comprising a plurality of video clips;

receiving a long text for describing a content of the video; and determining the images and the text based on the plurality of images and the long text according to a machine learning model.

5. The method according to claim 1, wherein the images and the text are determined by:

receiving a summary text for describing a video comprising a plurality of video clips;

determining a plurality of texts for respectively describing contents of the plurality of video clips in the video based on the summary text according to a machine learning model;

generating a target image based on a target text in the plurality of texts according to the machine learning model; and taking the target image as the image and the target text as the text.

6. The method according to claim 1, further comprising:

determining prompt information associated with a further target video subsequent to the target video based on the target video according to a machine learning model, wherein the prompt information comprises at least one image and a further text; and generating the further target video based on the at least one image and the further text according to the generation model.

7. The method according to claim 1, wherein generating the target video further comprises:

receiving an influencing factor for specifying a degree of influence of the second image;

dividing, based on the influencing factor, a plurality of steps for calling a diffusion model in the generation model into a first stage and a second stage;

determining, in the first stage and the second stage, a reconstruction feature of the target video based on the first image and the second image according to the diffusion model; and generating the target video based on the reconstruction feature by using a decoder model in the generation model.

8. The method according to claim 7, wherein determining the reconstruction feature of the target video comprises:

determining, in the first stage, an intermediate reconstruction feature associated with the target video based on the first image and the second image according to the diffusion model; and determining, in the second stage, the reconstruction feature based on the first image and the intermediate reconstruction feature according to the diffusion model.

9. The method according to claim 1, wherein the generation model is determined by:

determining a first reference image and a second reference image from a plurality of reference images in a reference video;

receiving a reference text for describing the reference video; and acquiring the generation model based on the first reference image, the second reference image and the reference text, the generation model being configured to generate the target video based on the text and any of the first image and the second image.

10. The method according to claim 9, wherein the first reference image is located at a head of the reference video, and the second reference image is located within a predetermined range at a tail of the reference video.

11. The method according to claim 9, wherein the generation model comprises an encoder model and a diffusion model, and acquiring the generation model based on the first reference image, the second reference image and the reference text comprises:

determining a first reference feature of the reference video by using the encoder model, the first reference feature comprising a plurality of reference image features of the plurality of reference images;

determining a second reference feature of the reference video by using the encoder model, the second reference feature comprising a first reference image feature of the first reference image and a second reference image feature of the second reference image; and determining the diffusion model based on the first reference feature, the second reference feature, and the reference text.

12. The method according to claim 11, wherein a first position of the first reference image feature in the second reference feature corresponds to a position of the first reference image in the reference video, and a second position of the second reference image feature in the second reference feature corresponds to a position of the second reference image in the reference video.

13. The method according to claim 12, wherein a dimension of the second reference feature is equal to a dimension of the first reference feature, and features at positions other than the first position and the second position in the second reference feature are set to be empty.

14. The method according to claim 13, further comprising: setting the second reference image feature to be empty according to a predetermined condition.

15. The method according to claim 11, wherein determining the diffusion model based on the first reference feature, the second reference feature, and the reference text comprises:

performing noising processing for the first reference feature and the second reference feature respectively to generate a first noise reference feature and a second noise reference feature;

connecting the first noise reference feature and the second noise reference feature to generate a noise reference feature of the reference video;

determining a reconstruction feature of the reference video based on the noise reference feature and the reference text by using the diffusion model; and updating the diffusion model based on a difference between the reconstruction feature and the reference feature.

16. The method according to claim 1, wherein the first head image is a first image frame in the target video, and the first tail image is a last image frame in the target video.

17. An electronic device, comprising:

at least one processing unit; and at least one memory coupled to the at least one processing unit and storing instructions for execution by the at least one processing unit, wherein the instructions, when executed by the at least one processing unit, cause the electronic device to perform acts for generating a video, the acts comprising:

receiving a first plurality of images for respectively describing a plurality of target images in a target video to be generated;

receiving a text for describing a content of the target video to be generated; and generating the target video based on the first plurality of images and the text according to a generation model, wherein the generating the target video comprises:

determining a feature for generating the target video, a first image feature of the first image is placed at a first position of the feature for generating the target video and a second image feature of the second image is placed at a tail position of the feature for generating the target video; and generating the target video based on the feature for generating the target video and the text.

18. A non-transitory computer readable storage medium having a computer program stored thereon, wherein the computer program, when executed by a processor, causes the processor to implement acts for generating a video, the acts comprising:

receiving a first plurality of images for respectively describing a plurality of target images in a target video;

receiving a text for describing a content of the target video; and generating the target video based on the first plurality of images and the text according to a generation model, wherein the generating the target video comprises:

determining a feature for generating the target video, a first image feature of the first image is placed at a first position of the feature for generating the target video and a second image feature of the second image is placed at a tail position of the feature for generating the target video; and generating the target video based on the feature for generating the target video and the text.

\* \* \* \* \*